(12) United States Patent
Shimada et al.

(10) Patent No.: US 6,283,438 B1
(45) Date of Patent: Sep. 4, 2001

(54) SHOCK ABSORBING HOLDER AND INFORMATION PROCESSOR HAVING SAME

(75) Inventors: Isao Shimada, Kakogawa; Hideki Harada; Masayuki Nakayama, both of Kobe; Mitsuaki Karumai, Osaka; Takeshi Mori, Ikeda; Yoshihiro Fukukawa, Kobe, all of (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 0 days.

(21) Appl. No.: 09/266,930

(22) Filed: Mar. 12, 1999

(30) Foreign Application Priority Data

Mar. 13, 1998 (JP) .................................................. 10-062846
Sep. 3, 1998 (JP) .................................................. 10-249363

(51) Int. Cl.[7] ..................................................... H05K 7/14
(52) U.S. Cl. ............................ 248/694; 361/683; 361/685
(58) Field of Search .................................. 248/632, 694; 361/683, 684, 685, 679, 725, 726; 360/97.02; 312/9.9, 223.2, 351, 223.1, 319.1

(56) References Cited

U.S. PATENT DOCUMENTS

| | | | |
|---|---|---|---|
| 5,004,207 | * 4/1991 | Ishikawa et al. | 360/97.02 |
| 5,394,306 | * 2/1995 | Koenck et al. | 361/809 |
| 5,422,767 | * 6/1995 | Hatchett et al. | 360/98.01 |
| 5,479,285 | * 12/1995 | Burke | 361/681 |
| 5,535,092 | * 7/1996 | Bang | 361/685 |
| 5,546,250 | 8/1996 | Diel | 360/97.02 |
| 5,587,854 | * 12/1996 | Sato et al. | 361/683 |
| 5,689,386 | 11/1997 | Morehouse et al. | 360/97.02 |
| 5,844,772 | * 12/1998 | Lee et al. | 361/683 |
| 5,943,208 | * 8/1999 | Kato et al. | 361/685 |
| 5,956,314 | * 9/1999 | Ishimatsu et al. | 369/247 |
| 6,052,255 | * 4/2000 | Kawabe et al. | 360/97.02 |

FOREIGN PATENT DOCUMENTS

| | | |
|---|---|---|
| 297 06 384 | 8/1997 | (DE) . |
| 0 309 279 | 3/1989 | (EP) . |
| 0 485 782 | 6/1998 | (EP) . |
| 6-38098 | 5/1994 | (JP) . |
| 7-106775 | 4/1995 | (JP) . |
| 8-162772 | 6/1996 | (JP) . |
| 92/11489 | 7/1992 | (WO) . |
| 95/32457 | 11/1995 | (WO) . |
| 96/19806 | 6/1996 | (WO) . |
| 99/39349 | 8/1999 | (WO) . |

* cited by examiner

Primary Examiner—Leslie A. Braun
Assistant Examiner—Jon Szumny
(74) Attorney, Agent, or Firm—Wenderoth, Lind & Ponack L.L.P.

(57) ABSTRACT

A shock absorbing holder for holding a device vulnerable to an effect by shock so as to wrap it up and protect it against shock. The shock absorbing holder includes a frame body structured smaller than an outer shape of the device, a holding portion having a shape similar to the outer shape of the device defined by inner wall surfaces of the frame body, and protruding portions provided on outer surface walls of the frame body. With the frame body extended, the device is accommodated in the holding portion, being intimately contacted to the inner wall surfaces of the frame body. When shock is imported from outside, the protruding portions are deformed to absorb the shock, protecting the accommodated device from the shock.

53 Claims, 24 Drawing Sheets

SHOCK ABSORBING HOLDER AND INFORMATION PROCESSOR HAVING SAME

BACKGROUND OF THE INVENTION

1. Field of the Invention

The present invention relates to shock absorbing holders and information processors having shock absorbing holders, and more specifically to a shock absorbing holder for holding a device vulnerable to shock such as a hard disk drive to protect the device against shock and securely storing the device after it has been removed from an information processor, and an information processor equipped with a device held by the shock absorbing holder.

2. Description of the Background Art

In recent years, the weight, size and thickness of information processors such as notebook computers have been reduced, improving their portability to allow outside use and the like. In such a portable information processor, a hard disk drive is used as a storage device for storing information. There are growing numbers of occasions of attaching/detaching this storage device to/from the information processor as required in order to expand its storage capacity or secure stored information. Further, the removed storage device is carried or stored alone.

As a result, when the information processor is carried, the storage device held in the information processor is damaged by shock and vibration given through the information processor. Further, when the storage device is carried alone, unlike when carried using the information processor, shock and vibration are directly imported to the storage device, resulting in more damage to the storage device. Even the storage device being stored may suffer damage by unexpected shock and vibration under certain circumstances in the storage place.

To avoid these situations, various schemes have been devised to suppress shock and vibration to the storage device and prevent damage to the storage device regardless of whether the storage device is held in the information processor or not.

Described below is a conventional shock absorbing holder and an information processor using the shock absorbing holder referring to FIGS. 23, 24 and 25.

FIG. 23 shows an information processor with a storage device held by a conventional shock absorbing holder embedded. For visibility, FIG. 23 shows a state in which an open/close lid L of a storage device storing portion 1c of an information processor DPp is open. In the information processor DPp, a keyboard 4 is arranged on an approximately upper-half portion of a case 1, and the storage portion 1c for components such as a storage device required to be attached/detached is provided on a lower-half portion thereof. Stored in the storage portion 1c are a main circuit board 2 and a storage device unit SU in which a hard disk drive is held by a shock absorbing holder. The storage device unit SU is connected to the main circuit board 2 by a signal cable 6. The open/close lid L is mounted on the upper surface of the storage portion 1c. Further, a display portion 5 is reclosably mounted on the upper end portion of the case 1.

FIG. 24 shows the structure of the storage device unit SU. The storage device unit SU is composed of a hard disk drive 3, a shock absorbing holder 51 and a cover 52. The shock absorbing holder 51 is molded of material with low hardness and repulsion, in a box container shape having a concave portion 51c in a shape according to the shape of the hard disk drive 3. The cover 52 is flatly molded of the same material as that of the shock absorbing holder 51.

The storage device unit SU is structured so as to accommodate the hard disk drive 3 in the concave portion 51c of the shock absorbing holder 51 and fit the cover 52 into the concave portion 51 to hold down the hard disk drive 3. Part of the signal cable 6 of the hard disk drive 3 is kept extended outside of the storage device unit SU between the shock absorbing holder 51 and the cover 52 so as to connect to the main circuit board 2, as described above.

FIG. 25 shows a state of the storage device unit SU when the information processor DPp receives shock from its side surface. When shock is imported from an arrow Fa direction to the case 1 of the information processor DPp, a force to move in a Fr direction opposed to the Fa direction occurs in the hard disk drive 3. However, the shock absorbing holder 51 and the cover 52 are made of material with low hardness and low repulsion, and therefore, as the hard disk drive 3 moves in the Fr direction, portions adjacent to the hard disk drive 3 in the shock absorbing holder 51 become deformed to absorb the shock on the hard disk drive 3. Such deformation prevents damage to the hard disk drive 3 by shock.

When the hard disk drive 3 is removed from the case 1 and carried or stored for capacity expansion and security, the hard disk drive 3 is not handled as the storage device unit SU, but is removed from the shock absorbing holder 51 and the cover 52 and handled alone.

As described above, gel material with low hardness and low repulsion is conventionally adopted for the shock absorbing holder 51 in order to improve a shock absorbing effect in the information processor. However, due to gel material's low hardness and repulsion, the shock absorbing holder 51 molded in a box container shape does not have a freestanding characteristic. That is, the shock absorbing holder 51 cannot keep its box shape without some other supporting means. Therefore, when the shock absorbing holder 51 is set in the storage portion 1c of the case 1 before the hard disk drive 3 is embedded in the case 1, the shock absorbing holder 51 loses its shape.

With the shock absorbing holder 51 having no freestanding characteristic and losing its shape, it is very difficult to assemble the storage device unit SU. Since the shock absorbing holder 51 changes its shape during assembly of the storage device unit SU, stable shock absorbing capability and holding capability cannot be ensured even when the storage device unit SU was managed to be assembled.

To cope with these problems, the following three methods have been conventionally used. A first method increases the hardness of the material of the shock absorbing holder 51 to prevent it from losing its shape. A second method increases the wall thickness of the material of the shock absorbing holder 51 more than required to ensure a freestanding characteristic. A third method makes the size of the concave portion 51c of the shock absorbing holder 51 larger than the size of the hard disk drive 3 so that the shock absorbing holder 51 can accommodate the hard disk drive 3 even after losing its shape.

However, as in the first and third methods, with the hardness of the material of the shock absorbing holder 51 increased and with the size of the concave portion 51c made next larger than that of the hard disk drive 3, the shock absorbing holder 51 cannot sufficiently receive the hard disk drive 3 when the case 1 receives shock and cannot protect the hard disk drive 3 enough against the shock. Also in the second method, increasing the wall thickness of the shock absorbing holder 51 more than required is against the requirement of reduction in weight, size and thickness of the information processor, as described later.

When the shock absorbing holder 51 is made of gel material with high shock absorbing capability, the following problem may further occur. That is, since gel material has high viscosity, the shock absorbing holder 51 intimately contacts with the case 1, which makes it difficult to attach/detach the storage device unit SU to/from the case 1. Due to low thermal conductivity, it is difficult for gel material to dissipate heat from the hard disk drive 3. As a result, overheating of the held hard disk drive 3 is likely to occur.

Furthermore, in recent years, the size and thickness of information processors has been reduced for improving portability. Therefore, the thickness of the shock absorbing holder has to be reduced. A hard disk drive is also reduced in thickness and structured in a flat shape, so to speak. Described below is a case in which the storage device unit SU accommodating the flatly-shaped hard disk drive 3 in the thin-shaped shock absorbing holder 51 receives shock on a side surface 3a of the hard disk drive 3 from the Fa direction, referring to FIG. 25.

Shock force centers on a narrow area of the side surface 3a of the thin-shaped hard disk drive 3. The shock absorbing holder 51 has to absorb the shock forcing the hard disk drive 3 in the Fr direction into the very narrow side surface 3a of the hard disk drive 3. Therefore, in the thin-shaped hard disk drive 3, even though shock force per unit area of the side surface 3a is several times that of a storage device unit SU equipped with a not-thin-shaped hard disk drive 3, the volume of the shock absorbing holder 51 capable of absorbing shock force is a fraction of that of the latter. As a result, the hard disk drive 3 digs into the shock absorbing holder 51, thereby reducing the shock absorbing effect of the shock absorbing holder 51.

Further, when material having a property of low hardness and a low repulsion coefficient such as gel material is used for the shock absorbing holder 51 and its walls are thin, in the worst case, the shock absorbing holder 51 cannot absorb shock by the movement of the hard disk drive 3, causing the side surface 3a of the hard disk drive 3 to bump against the case 1 and other components over the shock absorbing holder 51. In this case, it is needless to say that the hard disk drive 3 suffers serious damage.

On the other hand, when shock force parallel to the bottom surface of the storage unit SU, that is, the shock force perpendicular to the bottom surface of the concave portion 51c or the top or bottom surface of the cover 52 acts on the center portion of the bottom surface of the concave portion 51c, the shock force is equally received in the entire large area of the bottom surfaces of the concave portion 51c or the cover 52. As a result, the shock force is absorbed by the large volume of the shock absorbing holder 51 and the hard disk drive 3 does not suffer damage, unlike in the above case.

However, shock force not parallel to the bottom surface of the storage unit SU, that is, the shock force in a diagonal direction to the bottom surface of the concave portion 51c or the bottom surface of the cover 52 acts particularly on a part in the vicinity of the end portion of the bottom surface of the concave portion 51c, the hard disk drive 3 is exerted to move toward a diagonal direction Fs to the bottom surface of the concave portion 51c or the side wall of the case 1. In this case, the shock force centers on an edge portion C much narrower than the side surface 3a of the hard disk drive 3. As a result, the edge portion C of the hard disk drive 3 easily digs into the shock absorbing holder 51 to bump against the case 1. Further, in the worst case, the edge portion C of the hard disk drive 3 destroys the shock absorbing holder 51 and further directly bumps against the case 1 to cause serious damage to the hard disk drive 3 itself.

In this way, when material having low hardness and a repulsion coefficient is used to obtain a high shock absorbing effect, assembling convenience, downsizing and heat dissipation of the information processor are extremely inhibited. Further, when the hard disk drive 3 is removed from the information processor DPp and stored alone in view of maintenance and security, the hard disk drive 3 having the conventional structure is once removed from the shock absorbing holder to be in an unsecured state. Therefore, there have been growing numbers of occasions when, in such an unsecured state, the hard disk drive 3 receives unprepared shock due to falling, etc., to suffer damage.

Further, when the hard disk drive 3 is removed to be handled alone, there exist problems such as the inconvenience of handling the signal cable 6 extending from the hard disk drive and the possibility of a break, etc., and therefore the handling of the hard disk drive 3 requires extra caution. Moreover, when the hard disk drive 3 is embedded again in the information processor DPp, assembling the storage unit SU is difficult.

SUMMARY OF THE INVENTION

The present invention is to solve the above problems, and an object of the present invention is to provide a thin-walled shock absorbing holder made of material with low hardness, fitted to a shock-sensitive device such as a hard disk drive for protecting the shock-sensitive device from shock or vibration. Another object is to provide a shock absorbing holder, capable of being easily fitted to the above shock-sensitive device, for intimately contacting the inserted shock-sensitive device to ensure stable shock absorbing capability and capable of handling the shock-sensitive device alone after it has been removed from an information processor. Still another object of the present invention is to provide a shock absorbing unit structured so that the above shock absorbing holder is fitted to the shock-sensitive device, and a small-size, light-weight information processor including the shock absorbing unit.

The present invention has the following features to solve the problems above.

A first aspect of the present invention is directed to a shock absorbing holder having low hardness and low repulsion properties for holding and protecting, as wrapping up to fit a shock-sensitive device therein, the device against shock, comprising:

- a frame body structured in a shape smaller than an outer shape of the device for predetermined dimensions; and
- holding means structured in a shape, defined by inner wall surfaces of the frame body, similar to the outer shape of the device; wherein
- the frame body is extended to accommodate the device in the holding means as intimately contacting with the inner wall surfaces of the frame body; and
- the frame body is deformed to absorb shock from outside to the accommodated device.

As described above, in the first aspect, even when the thickness of the shock absorbing holder is made thin and its hardness is made low, the shock absorbing holder can stand alone in a state of being fitted to the shock-sensitive device vulnerable to effects by shock to the hard disk drive, etc., thereby allowing easy assembling and ensuring stabilized capability. Furthermore, the frame body is deformed to absorb shock to protect the accommodated shock-sensitive device.

According to a second aspect, in the first aspect, the frame body is structured of gel polystyrene of a hardness ASKER/FP of 30 to 80.

As described above, in the second aspect, the shock absorbing holder is structured of gel polystyrene of a hardness ASKER/FP of 30 to 80, thereby obtaining a desired shock absorbing effect and the amount of extension for wrapping up the outer shape of the shock-sensitive device.

According to a third aspect, in the first aspect, the frame body is structured of thermal conductive material.

As described above, in the third aspect, it is possible to dissipate heat occurring from the device accommodated in the shock absorbing holder.

According to a fourth aspect, in the third aspect, the thermal conductive material includes a metal filler.

According to a fifth aspect, in the first aspect, the frame body forms walls opening inside, having a U-shaped section and forming a ring shape, and the holding means is defined by the U-shaped section.

As described above, in the fifth aspect, the inner wall of the shock absorbing holder structured so as to have a U-shaped section is fitted along the outer shape portion of the shock-sensitive device, and therefore it is possible to easily and securely accommodate the shock-sensitive device.

According to a sixth aspect, in the fifth aspect, the device is structured in a shape defined by two surfaces approximately parallel to each other and a plurality of side surfaces approximately perpendicular to the two surfaces;

the walls comprise:

side walls having a shape corresponding to side surfaces of the device;

a top wall extending from upper end portions of the side walls in an approximately perpendicular direction for a first predetermined length; and a bottom wall extending from lower end portions of the side walls in an approximately perpendicular direction for a second predetermined length; and the side walls, the top wall and the bottom wall form the U-shaped section.

According to a seventh aspect, in the sixth aspect, part of the top wall is provided with a concave portion having a predetermined depth.

As described above, in the seventh aspect, a concave portion is provided on the upper surface of the shock absorbing holder. Therefore, even when the shock absorbing holder accommodating the shock-sensitive device is installed in another information device, it is possible to secure space between the information device and the shock-sensitive device by the concave portion to dissipate heat occurring in the shock-sensitive device from the space. Furthermore, the shock absorbing holder can relieve the amount of deformation for absorbing shock to the concave portion.

According to an eighth aspect, in the first aspect, a protruding portion is formed on an outer wall surface of the frame body and the protruding portion is deformed to absorb shock from outside to the accommodated device.

According to a ninth aspect, in the eighth aspect, the protruding portion is provided on at least any one of the side walls, the top wall and the bottom wall.

As described above, in the ninth aspect, when the shock absorbing holder accommodating the shock-sensitive device receives shock, before the shock is transferred to the shock absorbing holder, the protruding portion first receives the shock and is deformed itself to absorb the shock, and then not-absorbed shock is transferred to the shock absorbing holder, thereby improving shock absorbing capability to the shock-sensitive device.

According to a tenth aspect, in the ninth aspect, the protruding portion is provided in at least one direction on a ring-shaped outer rim of the frame body.

As described above, in the tenth aspect, the protruding portion is arranged especially on a part most susceptible to shock, thereby effectively absorbing the shock to the accommodated shock-sensitive device.

According to an eleventh aspect, in the first aspect, at least one or more openings are formed on the frame body.

As described above, in the eleventh aspect, the amount of deformation of the shock absorbing holder for absorbing shock can be relieved to the opening.

According to a twelfth aspect, in the first aspect, the shock absorbing holder is integrally molded of two or more materials having different hardness or different repulsion coefficient properties.

As described above, in the twelfth aspect, the hardness and the repulsion coefficient of the shock absorbing holder are selected according to a degree of susceptibility to shock for each direction of the accommodated shock-sensitive device. Therefore, it is possible to set the wall thickness of the shock absorbing holder to an effective one, and combining shock absorbing holder having different hardness and different repulsion coefficients ensures effective shock absorbing capability taking advantage of each property.

According to a thirteenth aspect, in the twelfth aspect, the materials are elastic bodies and insert-molded.

As described above, in the thirteenth aspect, a elastic body with a different hardness or a different repulsion coefficient from that of the shock absorbing holder is insert-molded, and thereby it is possible to construct a shape more suitable for the actual shape of the shock absorbing holder and the shock-sensitive device. As a result, it is possible to stabilize the shock absorbing capability and handle the shock absorbing holder more easily when assembling and replacement.

According to a fourteenth aspect, in the first aspect, a case for wrapping up the device accommodated in the holding means.

As described above, in the fourteenth aspect, the shock absorbing holder with viscosity is wrapped up by the case, and therefore it is easy to attach/detach the shock-sensitive device held by the shock absorbing holder to/from other devices.

According to a fifteenth aspect, in the fourteenth aspect, the shock absorbing holder further comprises a box-shaped chassis having an engaging portion for engaging in the case; wherein the case is inserted in the engaging portion.

As described above, in the fifteen aspect, the shock absorbing holder with viscosity wrapped up by the case is further covered with the chassis, thereby allowing easy handling. Even when the shock-sensitive device removed from other devices is handled alone, the shock absorbing holder can absorb shock as a unit and prevent the shock-sensitive device from being damaged when erroneously falling down.

According to a sixteenth aspect, in the fourteenth aspect, the case is structured by a sheet material being folded.

As described above, in the sixteenth aspect, a sheet material is folded to construct a case, allowing the case to wrap up the shock absorbing holder with viscosity in intimate contact. Therefore, the shock-sensitive device held by the shock absorbing holder is easy to handle.

According to a seventeenth aspect, in the fourteenth aspect, the case is provided with an opening.

As described above, in the seventeenth aspect, the amount of deformation of the shock absorbing holder to absorb shock can be relieved from the opening.

According to an eighteenth aspect, in the fourteenth aspect, the case is formed to make a space in a predetermined size with the shock absorbing holder accommodating the device, and when the accommodated device receives shock from outside, the shock absorbing holder is deformed along the space to absorb the shock.

A nineteenth aspect is directed to, in the first aspect, an elastic body arranged between the device and the shock absorbing holder, having a property of a different hardness or a different repulsion coefficient from that of the shock absorbing holder; wherein shock to the device is transferred through the elastic body to the shock absorbing holder.

A twentieth aspect is directed to a shock absorbing holder having low hardness and low repulsion properties for holding and protecting, as wrapping up to fit a shock-sensitive device therein, the device against shock, comprising:

a box structured in a shape larger than an outer shape of the device for predetermined dimensions; and holding means structured in a shape defined by inner wall surfaces of the box similar to the outer shape of the device.

As described above, in the twentieth aspect, the opening provided on the frame body can relieve the amount of deformation of the shock absorbing holder, thereby allowing effective shock absorption of the shock absorbing holder.

According to the twenty-first aspect, in the twentieth aspect, the box is structured of gel polystyrene of a hardness ASKER/FP of 30 to 80.

As described above, in the twenty-first aspect, the shock absorbing holder is structured of gel polystyrene of a hardness ASKER/FP of 30 to 80, thereby obtaining a desired shock absorbing effect.

According to a twenty-second aspect, in the twentieth aspect, the box is structured of thermal conductive material, dissipating heat from the accommodated device outside.

As described above, in the twenty-second aspect, it is possible to dissipate heat occurring from the device accommodated in the shock absorbing holder.

According to a twenty-third aspect, in the twenty-second aspect, the thermal conductive material includes a metal filler.

According to a twenty-fourth aspect, in the twentieth aspect, the thermal conductive material includes a metal filler.

According to a twenty-fifth aspect, in the twentieth aspect, the box (21) is integrally molded of two or more materials having different hardness or different repulsion coefficient properties.

As described above, in the twenty-fifth aspect, since the hardness and the repulsion coefficient of the shock absorbing holder can be selected for each direction of the accommodated shock-sensitive device according to a degree susceptible to shock, the thickness of the shock absorbing holder can be set to an efficient one. Combining shock absorbing holders having different hardness and repulsion coefficients can ensure effective shock absorbing capability, taking advantage of each shock absorbing holder.

According to a twenty-sixth aspect, in the twenty-fifth aspect, the materials are elastic bodies and insert-molded.

As described above, in the twenty-sixth aspect, the elastic body with different hardness or a different repulsion coefficient from that of the shock absorbing holder is insert-molded, and therefore it is possible to construct in a shape more suitable for the actual shapes of the shock absorbing holder and the shock-sensitive device. As a result, the shock absorbing capability is stabilized and the shock absorbing holder is easy to handle when assembling and replacement.

According to a twenty-seventh aspect, in the twentieth aspect, a case for wrapping up the device accommodated in the holding means.

As described above, in the twenty-seventh aspect, the case wraps up the shock absorbing holder with viscosity, allowing the shock-sensitive device held by the shock absorbing holder to be attached/detached to/from other devices.

According to a twenty-eighth aspect, in the twenty-seventh aspect, the case is structured by a sheet material being folded.

According to a twenty-ninth aspect, in the twenty-seventh aspect, the case is structured of metal.

As described above, in the twenty-ninth aspect, the metal case wraps up the shock absorbing holder with viscosity, preventing the shock-sensitive device held by the shock absorbing holder from damage due to contact with outer hard members. Furthermore, it is possible to conduct heat occurring from the shock-sensitive device to dissipate it outside to prevent overheating.

According to a thirtieth aspect, in twenty-seventh aspect, the case is provided with an opening.

As described above, in the thirtieth aspect, the amount of deformation of the shock absorbing holder to absorb shock can relieve from the opening.

A thirty-first aspect is directed to, in the twentieth aspect, an elastic body arranged between the device and the shock absorbing holder, having a property of a different hardness or a different repulsion coefficient from that of the shock absorbing holder; wherein shock to the device is transferred through the elastic body to the shock absorbing holder.

As described above, in the thirty-first aspect, combining shock absorbing holder having different hardness or different repulsion coefficients ensures effective shock absorbing capability taking advantage of each property.

According to a thirty-second aspect, in the thirty-first aspect, the elastic body has higher hardness or a higher repulsion coefficient than that of the shock absorbing holder.

As described above, in the thirty-second aspect, the elastic body having a property of higher hardness or a higher repulsion coefficient than that of the shock absorbing holder distributes shock to make the shock absorbing holder sufficiently absorb shock, and therefore it is possible to ensure effective, stable shock absorbing capability.

According to a thirty-third aspect, in the thirty-second aspect, the elastic body has at least one surface among surfaces opposed to the device larger than a corresponding opposed surf ace of the device.

As described above, in the thirty-third aspect, the thickness of the shock absorbing holder is made thin, and even with small space in structure, the shock in a side surface direction of the flat-shaped shock-sensitive device can be distributed in a large area by the elastic body to be suffiently absorbed in a large area of the shock absorbing holder having low hardness and a low repulsion coefficient, thereby allowing absorption of larger shock.

According to a thirty-fourth aspect, in the thirty-first aspect, the elastic body intimately contacts with the holding means.

As described above, in the thirty-fourth aspect, intimate contact of the shock absorbing holder and the elastic body makes the shock absorbing capability stabilized and allows easy handling when assembled or replaced.

A thirty-fifth aspect is directed to, in the thirty-first aspect, a case with hardness higher than that of the elastic body; wherein the device accommodated in the holding device is inserted in the case.

As described above, in the thirty-fifth aspect, the case with high hardness makes the shock-sensitive device accommodated in the shock absorbing holder as one unit to enable shock absorption, allowing improvement in operability at attachment/detachment and mounting, shock absorption even when removed to be carried or stored, and prevention of damage when erroneously falling down and the like.

According to a thirty-sixth aspect, in the thirty-fifth aspect, a length of a signal cable for use in connection between a connector arranged outside the case with high hardness and the device is longer than a creepage distance between a lead opening of the signal cable in the device and the connector for no less than a maximum amount of deformation of the shock absorbing holder.

As described above, in the thirty-sixth aspect, when shock is given to the shock-sensitive device when attached/removed, the signal cable is deformed without receiving effect of movement and operation of the shock-sensitive device drive to keep electric contact. Further, the shock-sensitive device drive can be easily connected to a circuit board in other devices by the connector outside the case when attached/detached or mounted, and since the cable is not exposed outside the case, it is easy to handle.

According to a thirty-seventh aspect, in the twenty-seventh aspect, the case is formed so as to make a space in predetermined size with the shock absorbing holder accommodating the device, and when the accommodated device receives shock outside, the shock absorbing holder is deformed along the space to absorb the shock A thirty-eighth aspect is directed to, in the first aspect, an information processor with the device held and accommodated by the shock absorbing holder embedded.

A thirty-ninth aspect is directed to, in the twentieth aspect, an information processor with the device held and accommodated by the shock absorbing holder embedded.

These and other objects, features, aspects and advantages of the present invention will become more apparent from the following detailed description of the present invention when taken in conjunction with the accompanying drawings.

DESCRIPTION OF THE PREFERRED EMBODIMENT (First Embodiment)

Figure 1:
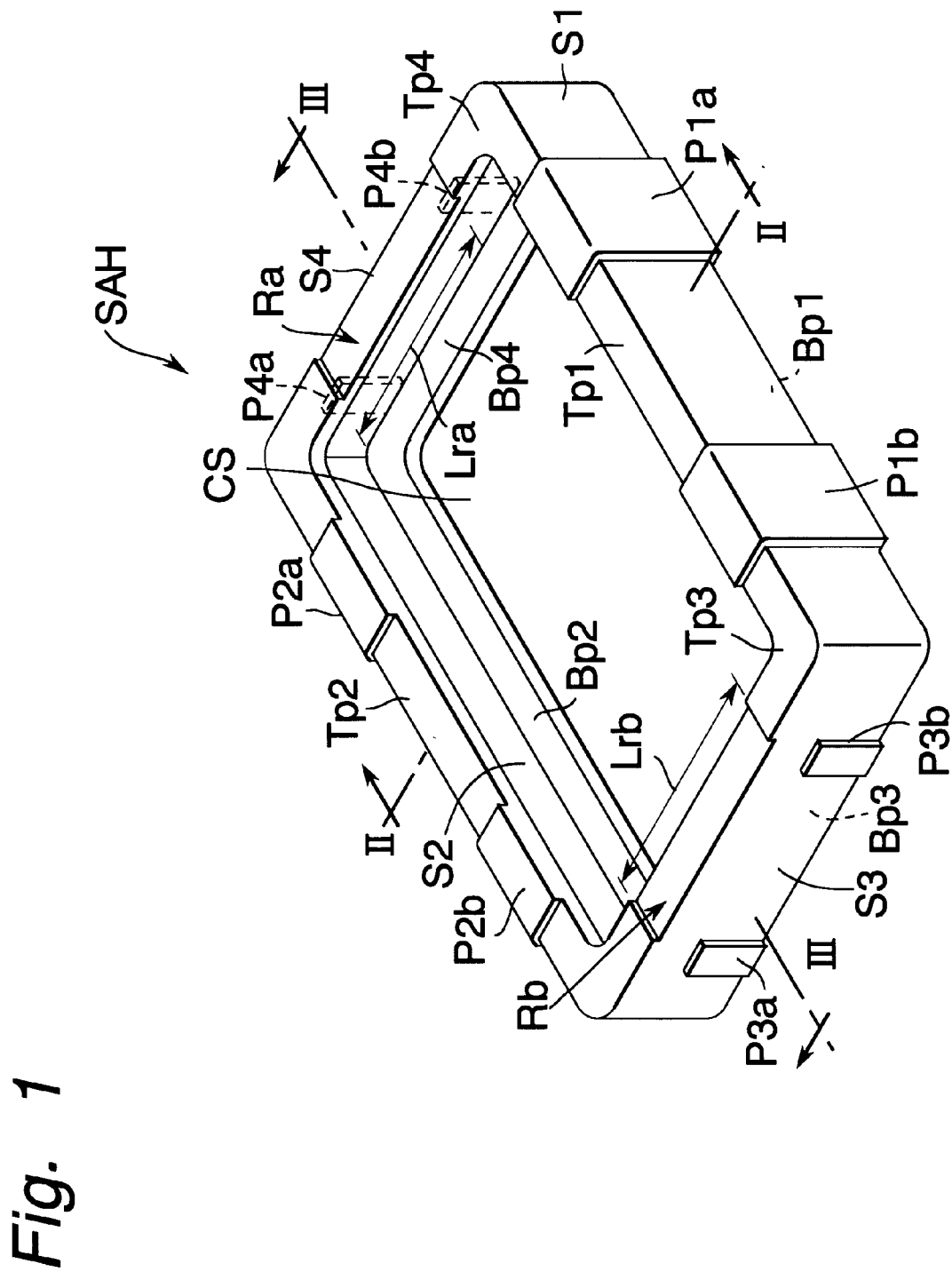
FIG. 1 is a perspective view showing a shock absorbing holder according to a first embodiment of the present invention.
Figure 2:
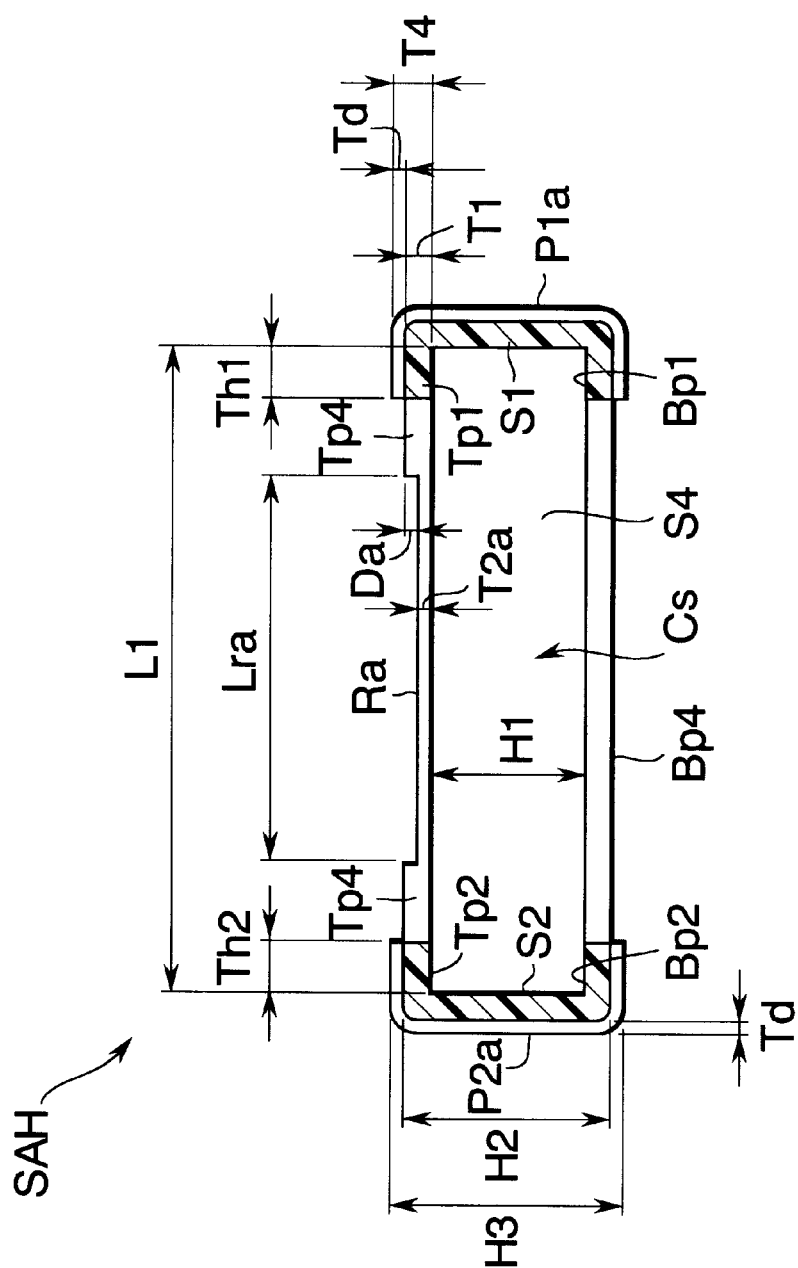
FIG. 2 is a II—II section view of the shock absorbing holder shown in FIG. 1.
Figure 3:
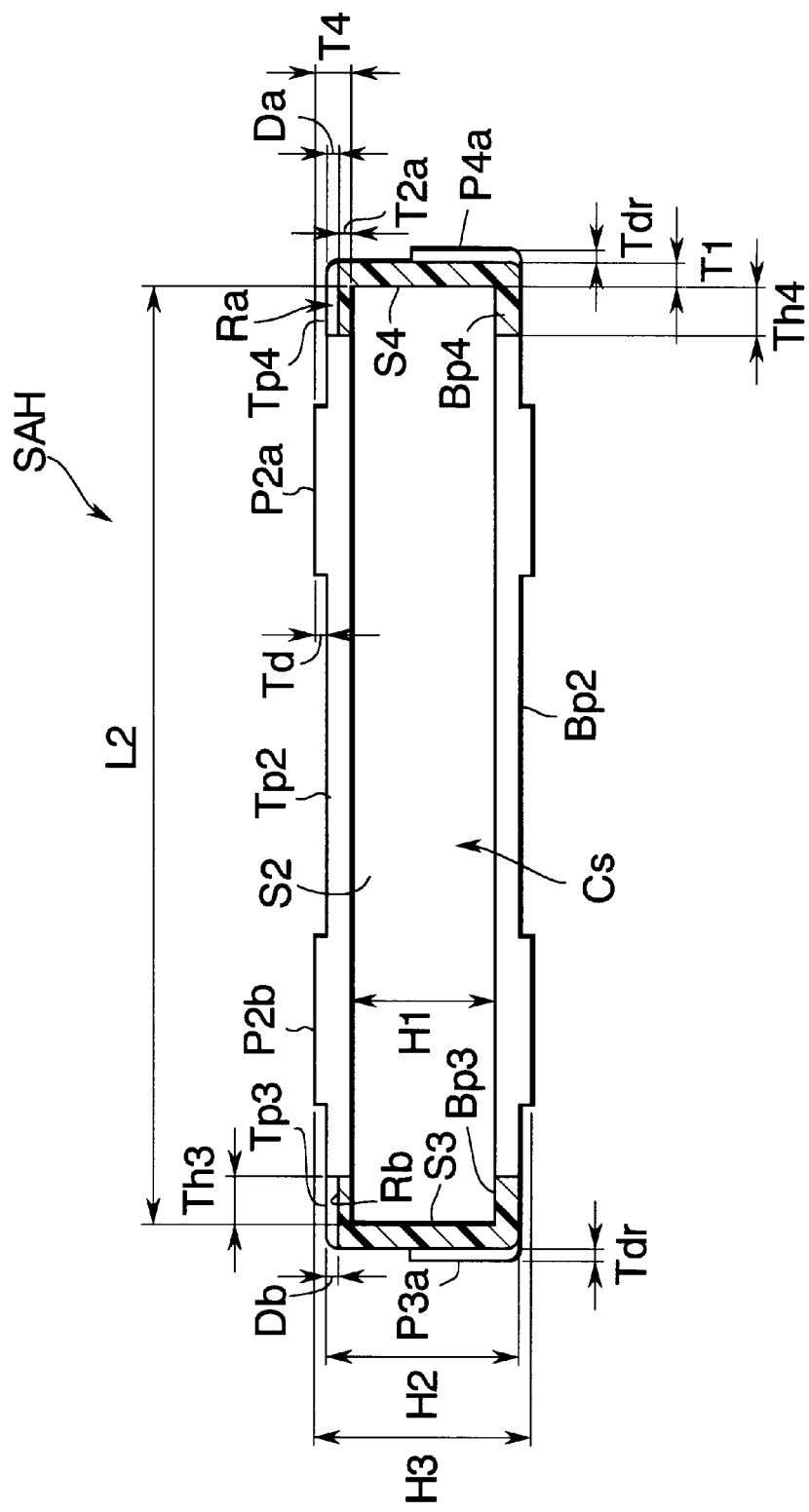
FIG. 3 is a III—III section view of the shock absorbing holder shown in FIG. 1.

Described below is a shock absorbing holder according to a first embodiment of the present invention referring to FIGS. 1, 2, 3, 4, 5, 6 and 7. FIG. 1 shows a perspective view of a shock absorbing holder (or frame body) SAH according to the first embodiment of the present invention. FIG. 2 shows a II—II section of the shock absorbing holder SAH in FIG. 1. FIG. 3 is a III—III section of the shock absorbing holder SAH in FIG. 1.

As shown in FIG. 1, the shock absorbing holder SAH is structured in such a way that a rectangular frame body is integrally structured by two side walls S1 and S2 approximately parallel to each other and two side walls S3 and S4 approximately perpendicular to the two side walls S1 and S2 and approximately parallel to each other. Of the four side walls, at least the two side walls S1 and S2 or the two side walls S3 and S4 preferably have the same shape. The shapes of these side walls S1, S2, S3 and S4 are determined as appropriate according to the shape of a device to be held by the shock absorbing holder SAH. In the present embodiment, the side walls S1, S2, S3 and S4 are formed in a rectangular shape based on a hard disk drive 3 to be accommodated in the shock absorbing holder SAH, as described later.

As shown in FIGS. 2 and 3, the side wall S2 is preferably defined by a predetermined thickness T1, a predetermined height H1 and a predetermined length L2. The side wall S1 has approximately the same shape as that of the side wall S2.

Similarly, as shown in FIGS. 3 and 2, the side wall S4 is preferably defined by a predetermined thickness T1, a predetermined height H1 and a predetermined length L1. The side wall S3 has approximately the same shape as that of the side wall S4. In the present embodiment, L1<L2.

As shown in FIGS. 1 and 2, a top plate Tp1 extending for a predetermined distance Th1 in a perpendicular direction from an upper end portion of the side wall S1 of the frame body to the opposed side wall S2 and defined by a thickness T1, a width Th1 and a length L2 is provided integrally with the frame body. Also from a lower end portion of the side wall S1, a bottom plate Bp1 extending for a predetermined distance Th2 in a perpendicular direction to the opposed side wall S2 and defined by a thickness T1, a width Th2 and a length L2 is provided integrally with the frame body. The thickness Th1 and the thickness Th2 may be same or not.

Similarly, a top plate Tp2 extending perpendicularly from an upper end portion of the side wall S2 to the side wall S1 and having approximately the same shape as that of the top plate Tp1 is provided integrally with the frame body. Also, a bottom plate Bp2 extending perpendicularly from a lower end portion of the side wall S2 to the side wall S1 and having approximately the same shape as that of the bottom plate Bp1 is provided integrally with the frame body.

Figure 4:
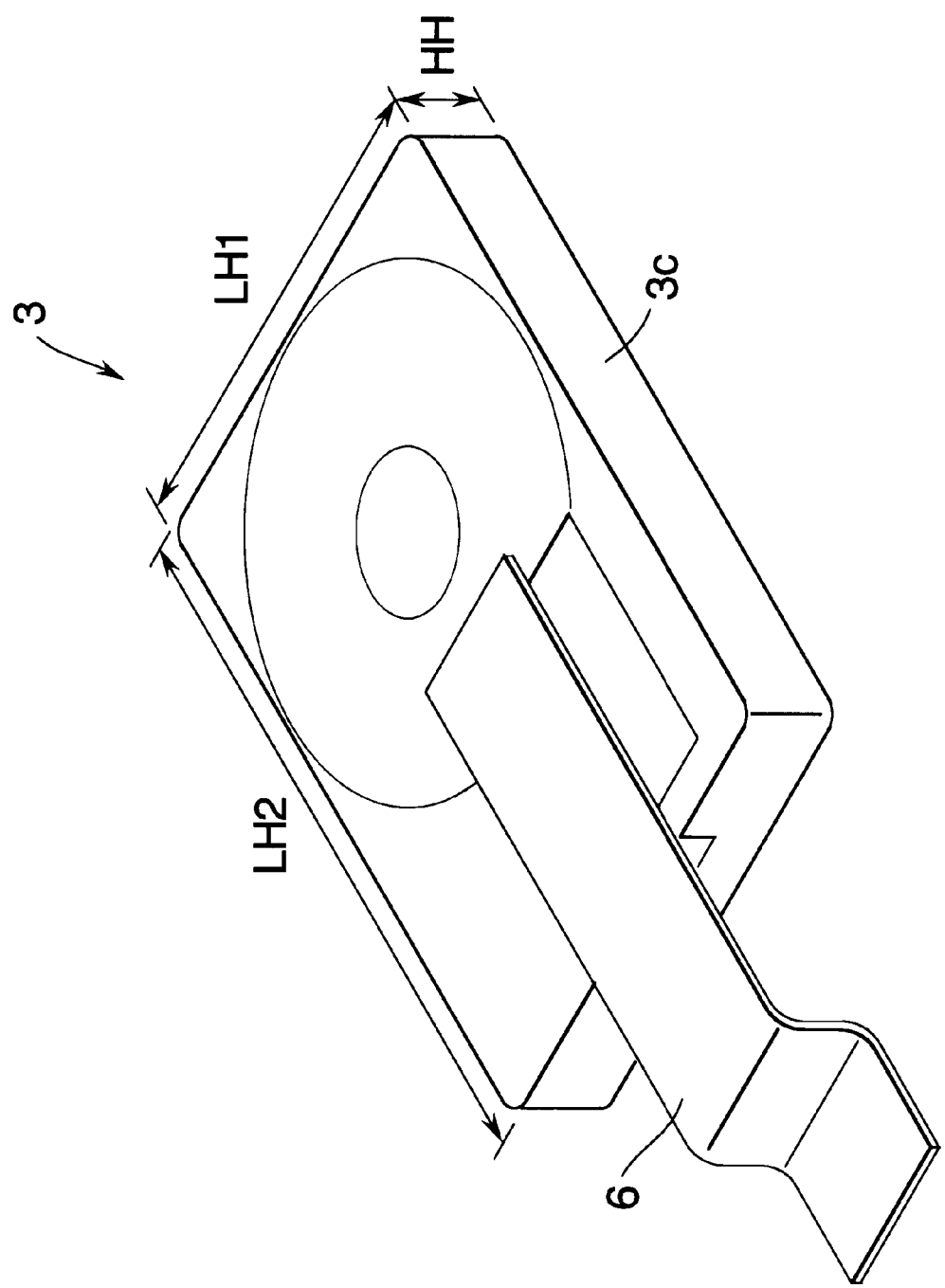
FIG. 4 is a perspective view showing an example of a shock-sensitive device held in the shock absorbing holder shown in FIG. 1.

As shown in FIGS. 3 and 4, a top plate Tp3 extending for a predetermined distance Th3 perpendicularly from an upper end portion of the side wall S3 to the opposed side wall S4 and defined by a thickness T1, a width Th1 and a length L1 is provided integrally with the frame body. Also from a lower end portion of the side wall S3, a bottom plate Bp3 extending for a predetermined distance Th3 in a perpendicular direction to the opposed side wall S4 and defined by a thickness T1, a width Th3 and a length L1 is provided integrally with the frame body.

Similarly, a top plate Tp4 extending perpendicularly from an upper end portion of the side wall S4 to the side wall S3 and having approximately the same shape as that of the top plate Tp3 is provided integrally with the frame body. Also, a bottom plate Bp4 extending perpendicularly from a lower end portion of the side wall S4 to the side wall S3 and having approximately the same shape as that of the bottom plate Bp3 is provided integrally with the frame body.

In this way, typically shown in the section views of FIGS. 2 and 3, an outer rim portion is structured by the side wall S1, the top plate Tp1 and the bottom plate Bp1, open to an inner radius side and formed to have an approximately U-shaped section. Similarly, a rectangular ring-shaped outer wall is integrally formed by the side wall S2, the top plate Tp2 and the bottom plate Bp2; the side wall S3, the top plate Tp3 and the bottom plate Bp3; and the side wall S4, the top plate Tp4 and the bottom plate Bp4; open to the inner radius side and having an approximately U-shaped section. As a result, the shock absorbing holder SAH has a rectangular space CS defined by approximately a height H1, a width L1 and a length L2 therein. As described later in detail, since the rectangular space CS accommodates and holds a shock-sensitive device to be protected against shock, this rectangular space CS is hereinafter called accommodation space.

A concave portion Ra is formed on the top plate Tp4, extending from its center portion toward the side wall S1 side and the side wall S2 side over a predetermined length Lra, recessed from the surface of the top plate Tp4 for a predetermined depth Da. Similarly, a concave portion Rb is formed on the top plate Tp3, extending from its center portion over a predetermined length Lrb, recessed from the surface of the top plate Tp4 for a predetermined depth Db.

Further, spaced protruding portions P1a and P1b formed by integrally-formed protrusions in a U shape having a predetermined thickness Td are provided on the outer rim side of the frame body structured by the top plate Tp1, the side wall S1 and the bottom plate Bp1 of the shock absorbing holder SAH. Similarly, spaced protruding portions P2a and P2b formed by integrally-formed protrusions in a U shape having a predetermined thickness Td are provided on the outer rim side of the frame body structured by the top plate Tp2, the side wall S2 and the bottom plate Bp2 of the shock absorbing holder SAH. Although the protruding portions P1a and P2b and the protruding portions P2a and P1b are preferably provided in approximately opposed positions with respect to each other, they may be provided in not-opposed positions.

Protruding portion P3a and P3b having a predetermined thickness Tdr are provided integrally with the frame body on the outer rim surface of the side wall S3. Also, protruding portion P4a and P4b having a predetermined thickness Tdr are provided integrally with the frame body on the outer rim surface of the side wall S4. Although protruding portion P4a and P4b are preferably provided in positions approximately opposed to the protruding portions P3a and P3b, they may be provided in not opposed positions thereto. Although the protruding portions P3a, P3b, P4a and P4b have the same thickness Tdr in the present embodiment, they are not necessarily required to have the same thickness.

As described above, for the purpose of distinction among components, a suffix 1, 2, 3, or 4 identifying each side wall is added to a reference character S representing side walls such as S1, S2, S3 and S4, for example. However, when it is not particularly necessary to distinguish the side walls, the side walls are hereinafter simply represented as S without a suffix. Similarly, top plates Tp represent the top plates Tp1, Tp2, Tp3 and Tp4. Bottom plates Bp represent the bottom plates Bp1, Bp2, Bp3 and Bp4. When the above described components other than the top plates and the bottom plates are hereinafter represented without a suffix, it is represented that the components are not independently distinguished with an omitted suffix.

As a result of being structured as described above, the shock absorbing holder SAH has, as typically shown in section views in FIGS. 2 and 3, the space CS surrounded by a rectangular ring-shaped outer wall having an approximately U-shaped section therein. The inner space CS is a rectangular space defined by approximately the height H1, the width L1 and the length L2. The rectangular space CS accommodates a shock-sensitive device to be protected against shock, and in this sense, this rectangular space is hereinafter called the accommodation space CS. Described in detail below is a method for accommodating a shock-sensitive device in the accommodation space CS of the shock absorbing holder SAH referring to FIGS. 4, 5, 6 and 7.

Figure 24:
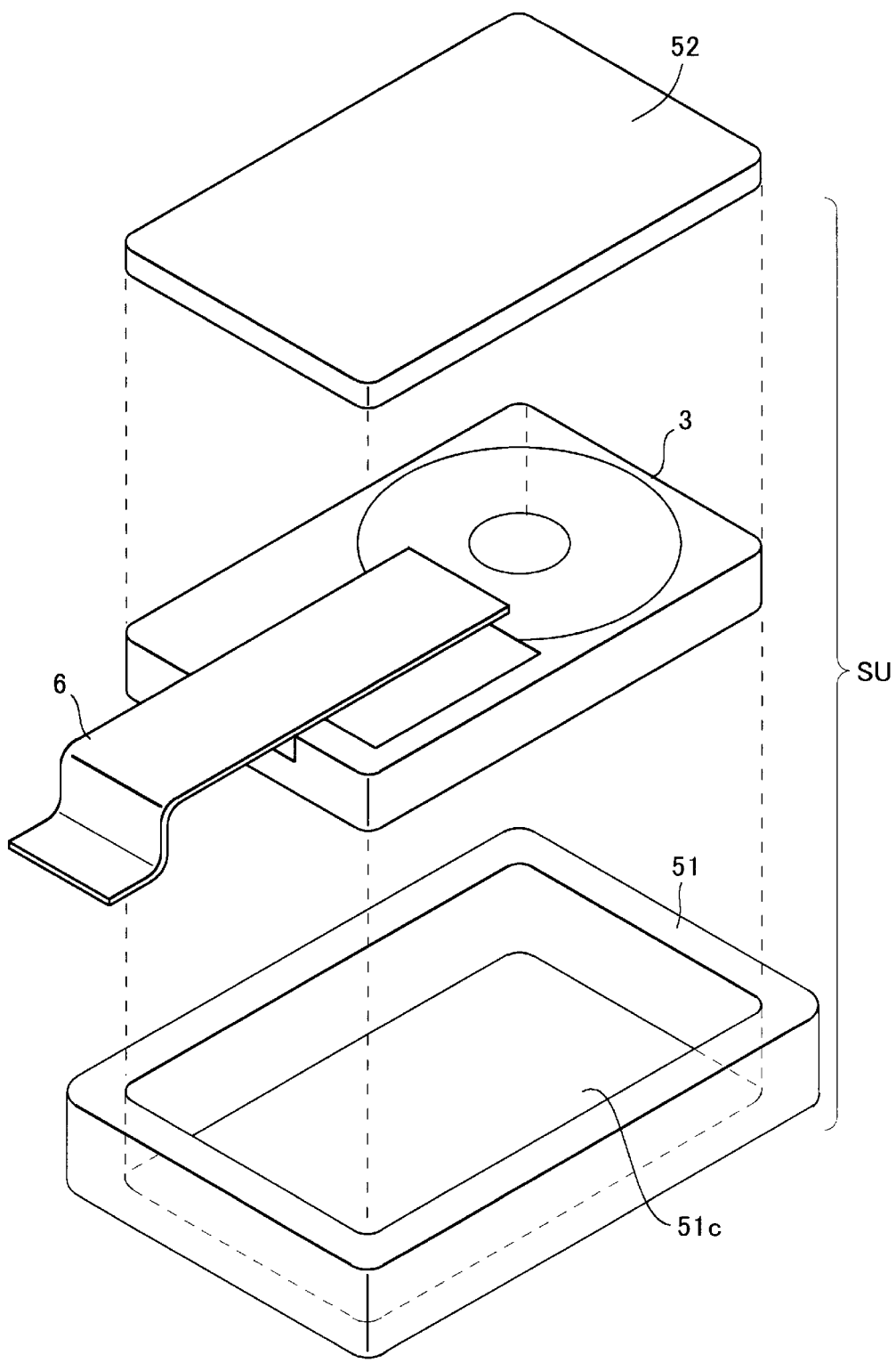
FIG. 24 is an exploded developed view of the storage device unit shown in FIG. 23.
Figure 25:
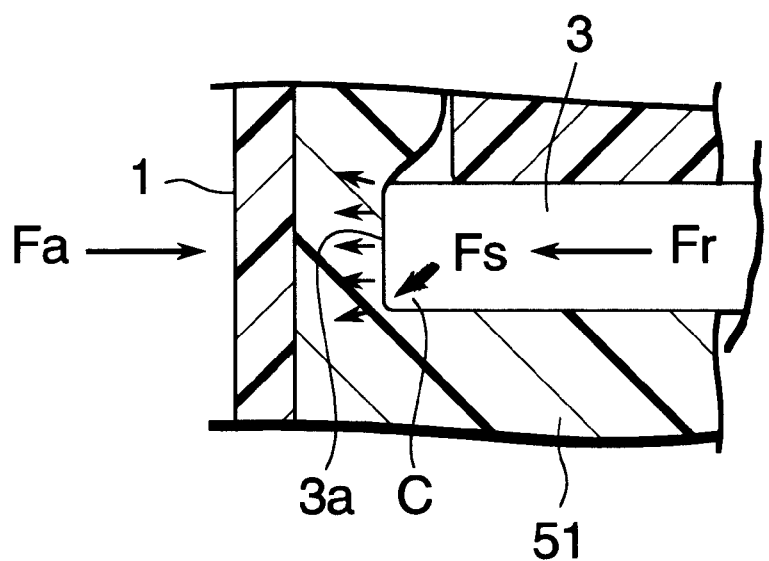
FIG. 25 is a section view of main parts of the storage device unit showing a state when the information processor shown in FIG. 23 receives shock from its side surface.

Described first is a hard disk drive 3 as an example of the shock-sensitive device to be held in the accommodation space CS of the shock absorbing holder SAH according to the present invention referring to FIG. 4. The hard disk drive 3 is the same as that stored in the storage device unit SU to be embedded in the information processor DPp already described referring to FIG. 24. The hard disk drive 3 generally has an approximately parallelepiped shape defined by a height HH, a width LH1 and a length LH2.

The following equations hold between the shock absorbing holder SAH according to the present embodiment and the hard disk drive 3 accommodated and held thereby:

$$L1 < LH1 = L1 + \Delta L1 \quad (1)$$

$$L2 < LH2 = L2 + \Delta L2 \quad (2)$$

$$H1 \leq HH = H1 + \Delta H1 \quad (3)$$

$\Delta L1$, $\Delta L2$ and $\Delta H1$ are values appropriately determined based on the hardness and the degree of extension of the material structuring the shock absorbing holder SAH and the width LH1, the length LH2 and the height HH of the hard disk drive 3. That is, the shock absorbing holder SAH is structured so as to have the accommodation space CS whose volume is smaller than that of the shock-sensitive device to be accommodated and held.

Figure 5:
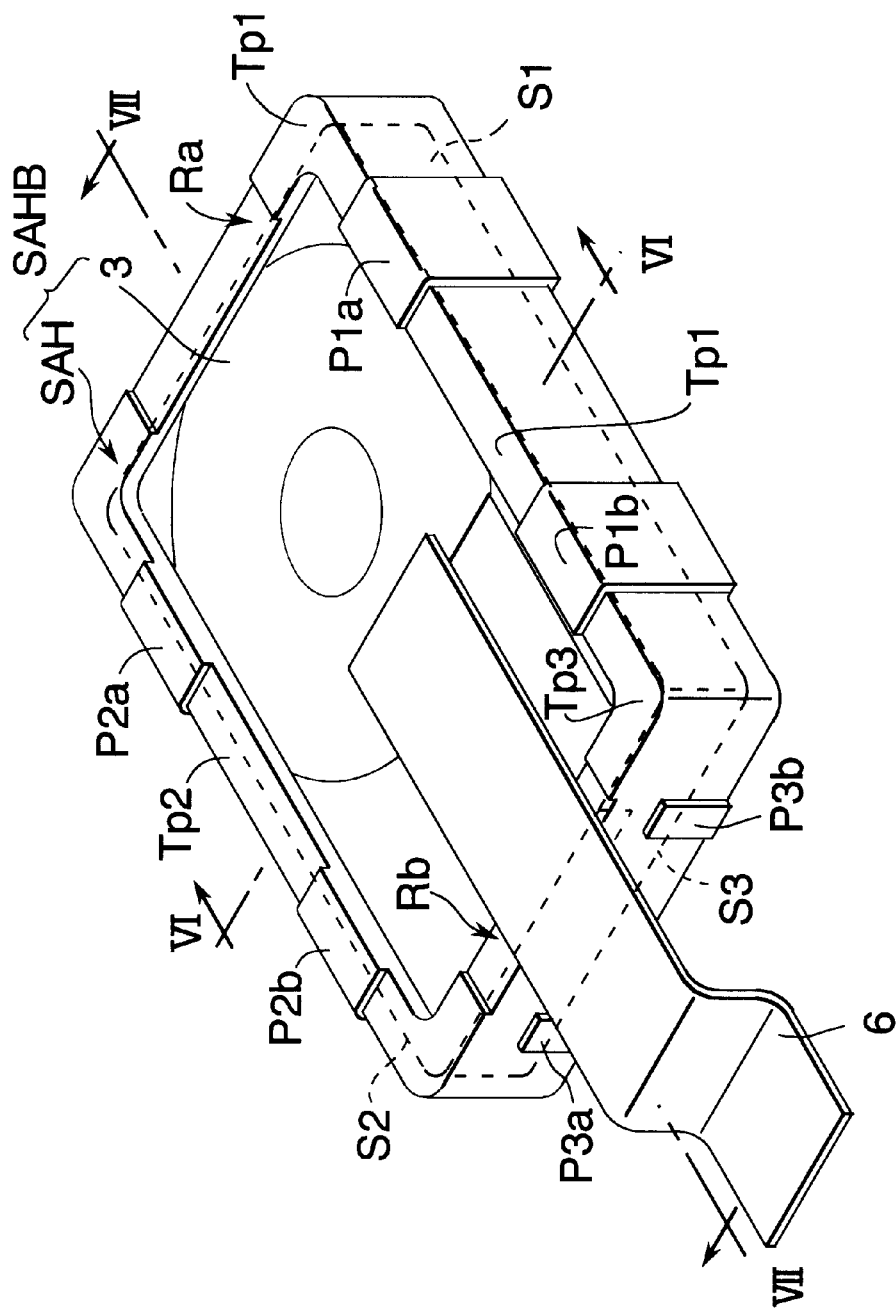
FIG. 5 is a perspective view showing a shock absorbing holder unit structured by fitting the shock absorbing holder shown to FIG. 1 on the shock-sensitive device shown in FIG. 4.

FIG. 5 shows a state in which the hard disk drive 3 is accommodated and held in the accommodation space CS of the shock absorbing holder SAH. In the present embodiment, the shock absorbing holder SAH is structured of material having low hardness and low repulsion such as gel material as described above. Therefore, when the hard disk drive 3 larger than the accommodation space CS is to be accommodated in the accommodation space CS, each part of the shock absorbing holder SAH such as each side wall S1, S2, S3 and S4; each top plate Tp1, Tp2, Tp3 and Tp4; and each bottom plate Dp1, Bp2, Bp3 and Bp4 are extended to allow the hard disk drive 3 to be inserted in the accommodation space CS.

After insertion, each extended part of the shock absorbing holder SAH will return back to the original length (thus, the material of the shock absorbing holder SAH is elastically deformable). However, the shock absorbing holder SAH now accommodates the hard disk drive 3 having a volume larger than the original volume of the accommodation space CS. Therefore, the shock absorbing holder SAH is being extended by the hard disk drive 3 for the above $\Delta L1$, $\Delta L2$ and $\Delta H1$. Extension force according to this extension allows the shock absorbing holder SAH to securely hold the hard disk drive 3 intimately contacting therewith.

Figure 6:
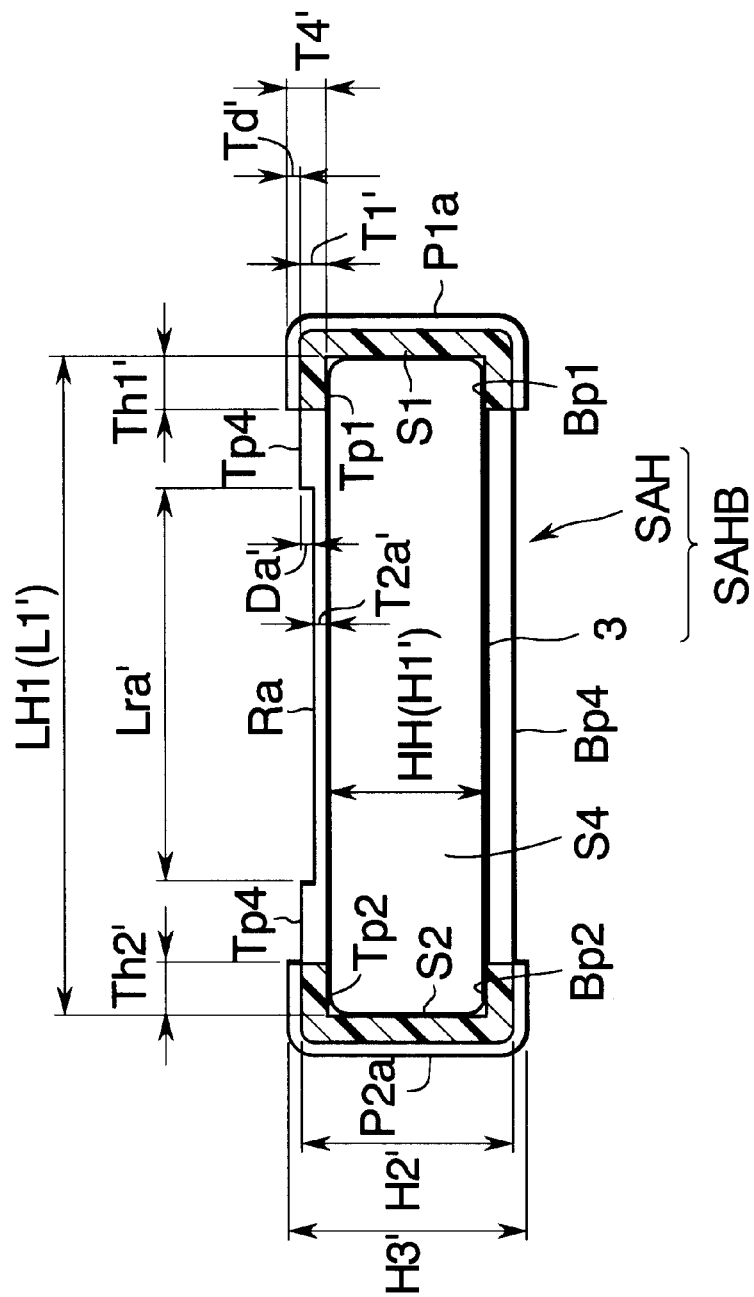
FIG. 6 is a VI—VI section view of the shock absorbing holder unit shown in FIG. 5.
Figure 7:
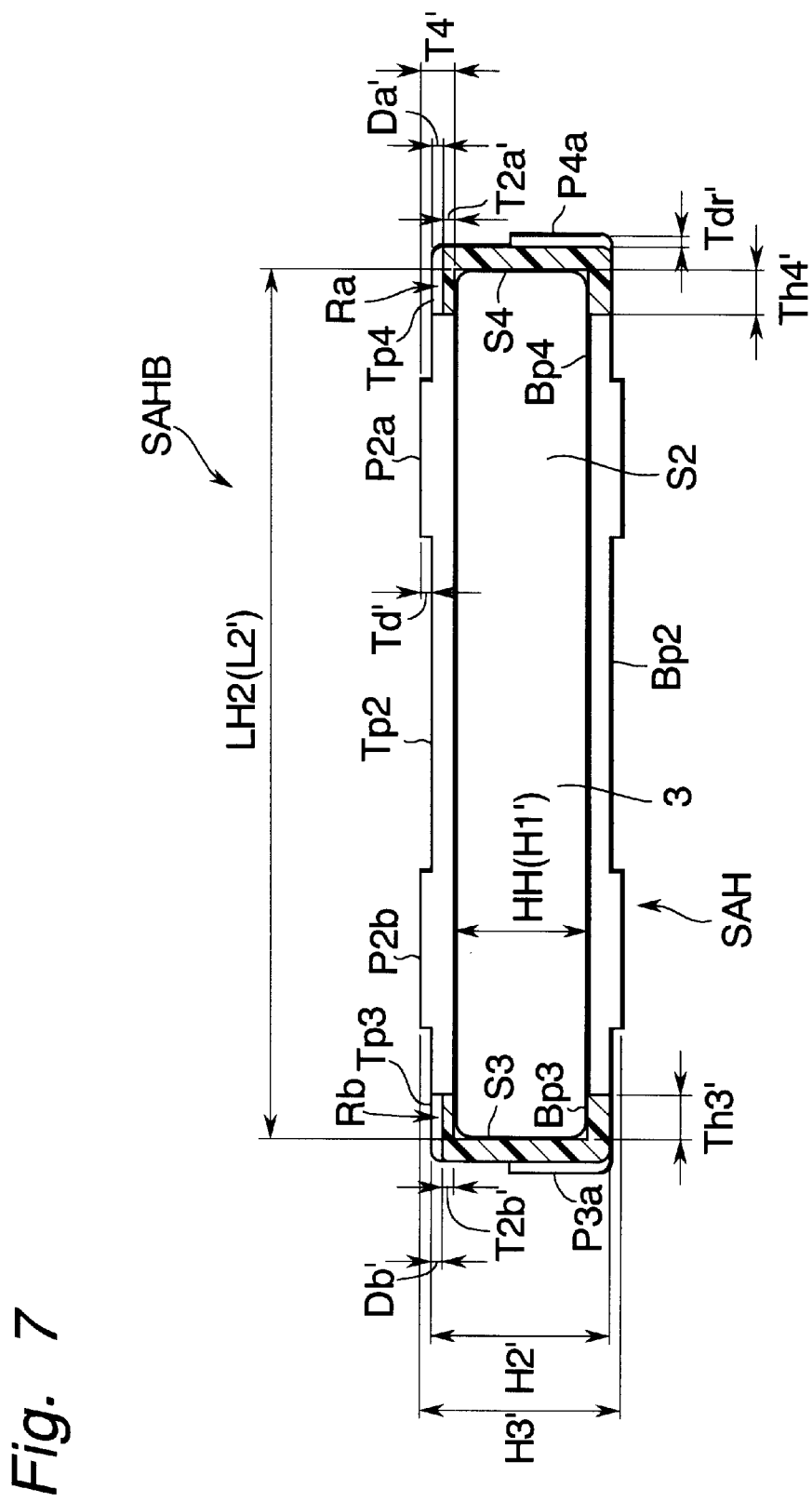
FIG. 7 is a VII—VII section view of the shock absorbing holder unit shown in FIG. 5.

FIGS. 6 and 7 show a VI—VI section and a VII—VII section of a shock absorbing holder unit SAHB shown in FIG. 5, respectively. The shock absorbing holder unit SAHB accommodates the hard disk drive 3 in the accommodation space CS of the shock absorbing holder SAH, thereby extending the height H1, the width L1 and the length L2 of the accommodation space CS of the shock absorbing holder SAH in single use to H1', L1' and L2', respectively. Further, the height H2 and the height H3 of the shock absorbing holder SAH are also extended to H2' and H3', respectively.

As described above, since the shock absorbing holder SAH intimately contacts with the accommodated hard disk drive 3, the dimensions H1', L1' and L2' are approximately the same as the dimensions HH, LH1, and LH2 of the hard disk drive 3, respectively. Thus, the relations shown in the following equations approximately hold:

$$L1' = LH1 = L1 + \Delta L1 \quad (4)$$

$$L2' = LH2 = L2 + \Delta L2 \quad (5)$$

$$H1' = HH = H1 + \Delta H1 \quad (6)$$

As a result of the above extension ($\Delta L1$, $\Delta L2$ and $\Delta H1$), other dimensions T1, T2, Td and T4 of the shock absorbing holder SAH are reduced to T1', T2', Td' and T4. The amount of reduction of each dimension $\Delta T1$, $\Delta T2$, $\Delta Td$ and $\Delta T4$ differ according to the above amount of extension ($\Delta L1$, $\Delta L2$ and $\Delta H1$) and physical properties of the material of the shock absorbing holder SAH.

Figure 23:
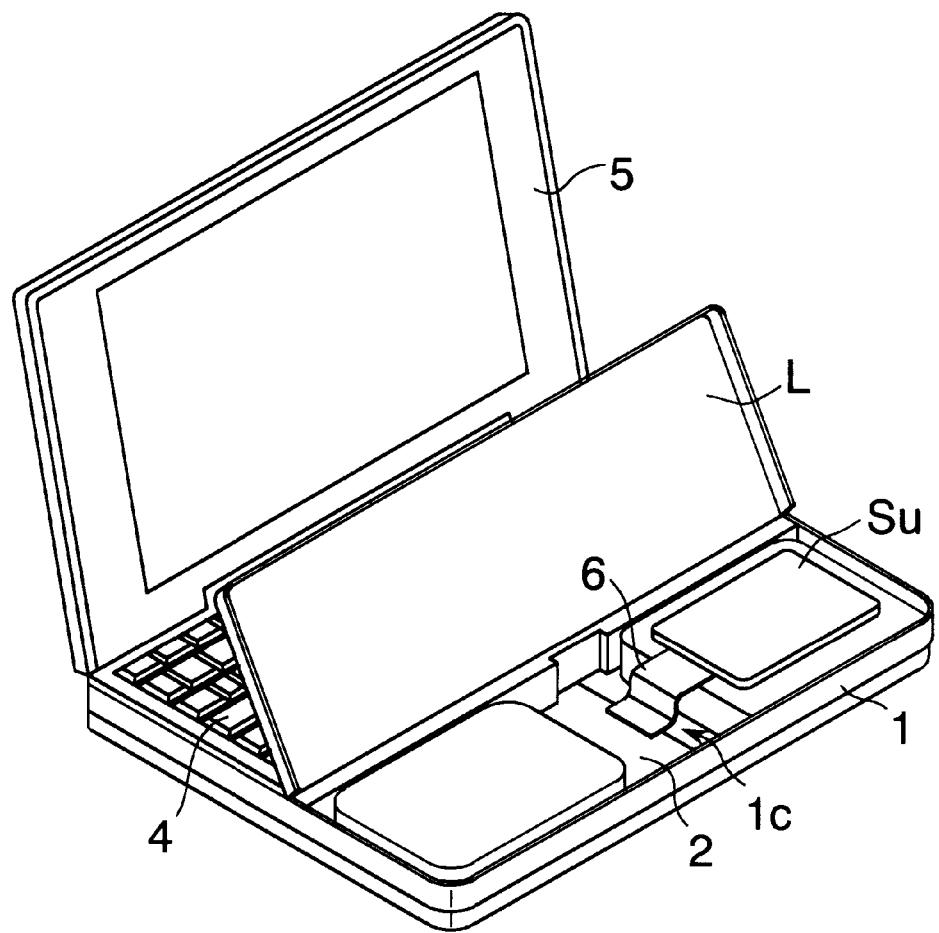
FIG. 23 is a descriptive diagram showing an information processor with a storage device unit held by a conventional shock absorbing holder embedded.

As shown in FIGS. 5, 6 and 7, the shock absorbing holder SAH structured of material having low hardness and low repulsion properties and having the outer walls having a U-shaped section is fitted to the outer rim of the rectangular flat case of the hard disk drive 3 so as to wrap it up. The shock absorbing holder unit SAHB as structured above is embedded in the information processor DPp in the same manner as that in the case when the storage device unit SU is embedded as described above referring to FIG. 23.

The shock absorbing holder unit SAHB as described above has the following features when used alone and also when being embedded in the information processor DPp. Once the shock absorbing holder SAH is extended to fit each side surface of the hard disk drive 3 in the U-shaped outer wall portion of the shock absorbing holder SAH, the hard disk drive 3 is held in the accommodation space CS by shrinkage force of the extended shock absorbing holder SAH. In this way, it is very easy to wrap up the outer rim of the hard disk drive 3 by the shock absorbing holder SAH.

Although the shock absorbing holder cannot stand alone, if the hard disk drive 3 is embedded therein to structure the shock absorbing holder unit SAHB, it does not lose its shape. Therefore, the shock absorbing holder SAH in the form of the shock absorbing holder unit SAHB can easily be attached/detached to/from the information processor DPp.

Furthermore, when the hard disk drive 3 being accommodated in the shock absorbing holder unit SAHB is removed from the case of the information processor for the purpose of maintenance, etc., the hard disk drive 3 is securely accommodated and held by the shock absorbing holder SAH.

Since the shock absorbing holder SAH is structured of material with low repulsion and low hardness such as gel material, if shock is imported to the shock absorbing holder unit SAHB, the shock absorbing holder SAH effectively reduces the shock transferred to the accommodated hard disk drive 3. The amount of attenuation of the transferred shock depends on how low the hardness and repulsion coefficient of the shock absorbing holder is, and the lower hardness and repulsion, the thinner-walled shock absorbing holder and the more efficient shock absorbing capability can be obtained.

By being structured of the material having such properties, the shock absorbing holder SAH absorbs shock before it is transferred to the accommodated hard disk drive 3 and can thereby protect the hard disk drive 3 against damage due to the shock. The same goes for a case in which the case of the information processor receives shock when being carried.

As the material for structuring the shock absorbing holder SAH in the present embodiment, gel polystyrene of a hardness ASKER/FP of 30 to 80 is adopted to obtain the maximum shock absorbing effect and the amount of extension required for wrapping up and accommodating the outer shape of the shock-sensitive device.

The shock absorbing holder SAH is designed so that the inner side dimensions of the ring-shaped outer wall are smaller than the outer dimensions of the hard disk drive 3. Therefore, when the shock absorbing holder SAH is fitted to the hard disk drive 3, more intimate contact can be achieved between the shock absorbing holder SAH and the hard disk drive 3, improving shock absorbing effects.

Each of the protruding portions P1a, P1b, P2a, P2b, P3a, P3b, P4a and P4b protruding outside of the outer wall portion of the shock absorbing holder SAH receives shock imported to the shock absorbing holder unit SAHB or the shock absorbing holder SAH before the shock is transferred to the side walls S, the top plates Tp and the bottom plates Bp which form the main body of the shock absorbing holder SAH. The protruding portions P themselves are deformed to significantly absorb the shock before the shock is transferred to the main body of the shock absorbing holder SAH. Shocks not absorbed at protruding portions P are absorbed by the main body of the shock absorbing holder SAH. In this way, two-step deformation of the protruding portions P and then the main body of the shock absorbing holder SAH improves shock absorbing capability of the shock absorbing holder SAH. Furthermore, the protruding portions P can secure space for relieving the amount of deformation of the shock absorbing holder SAH for shock absorption.

Although these protruding portions P are equally spaced on the side surface sides approximately opposed to each other of the side walls S1, S2, S3 and S4 in the present embodiment, the protruding portions P may be provided only in a direction especially vulnerable to shock, or may be provided intensively on a portion especially vulnerable to shock, such as each corner portion of the shock absorbing holder SAH.

In the present embodiment, even when the hardness and thickness of the shock absorbing holder is made low, the shock absorbing holder being extended and fitted to the hard disk drive 3 can keep standing alone. Therefore, it is possible to use a thinner-walled shock absorbing holder with lower hardness and higher shock absorbing capability, achieving highly efficient shock absorbing capability.

Furthermore, since the shock absorbing holder is integrally molded, it is easy to handle and its shock absorbing capability is stabilized.

The concave portions Ra and Rb provided on the upper surfaces of the shock absorbing holder SAH secure space for relieving the amount of deformation when the shock absorbing holder receives shock and also have the effect of helping dissipate heat from the hard disk drive 3 as ducts.

It is also possible to dissipate heat from the hard disk drive 3 by including a metal filler in the shock absorbing holder SAH or by providing an opening on the side surface.

In this way, the present embodiment can make the hardness and thickness of the shock absorbing holder low compared with the prior art, thereby achieving downsizing of the information processor and efficient shock absorbing capability.

Although the shock absorbing holder with low hardness and low repulsion has a shape structured by forming a U-shaped section shorter than the length of the outer rim of the hard disk drive case in a ring shape in the present embodiment, the shock absorbing holder may take any shape, as long as it has inner dimensions smaller than the outer dimension of the hard disk drive case, extended while being fitted to the hard disk drive and will not come off. For example, two shock absorbing holders may be fitted to the hard disk drive case, catching it therebetween from top and bottom.

Further, although the protruding portions are formed approximately in a rectangular shape in the present embodiment, they may be formed in any shape such as a spherical, oval figure, as long as they are suitable for absorbing shock to the shock absorbing holder SAH. The shape of the protruding portions P is preferably determined so as to absorb shock and effectively protect and hold the accommodated shock-sensitive device, in relation to the environment where the shock absorbing holder SAH accommodating the hard disk drive 3 is set or stored.

When a thinner-walled, more space-saving shock absorbing holder is required, it is also effective not to provide the protruding portions P for the shock absorbing holder SAH. In this case, although the shock absorbing effect by deformation of the protruding portions P cannot be expected, the frame body of the shock absorbing holder SAH itself can absorb shock. When the frame body of the shock absorbing holder SAH cannot absorb shock sufficiently, the shock absorbing capability of the entire frame body can be improved by setting the thickness of any or all wall portions S, Tp, and Bp of the frame body larger. In this way, when the thickness of the wall portions of the frame body is made larger, it is possible to make the outer dimensions of the shock absorbing holder SAH accommodating the shock-sensitive device smaller than those when the shock absorbing holder SAH has the protruding portions P.

(Second Embodiment)

Figure 8:
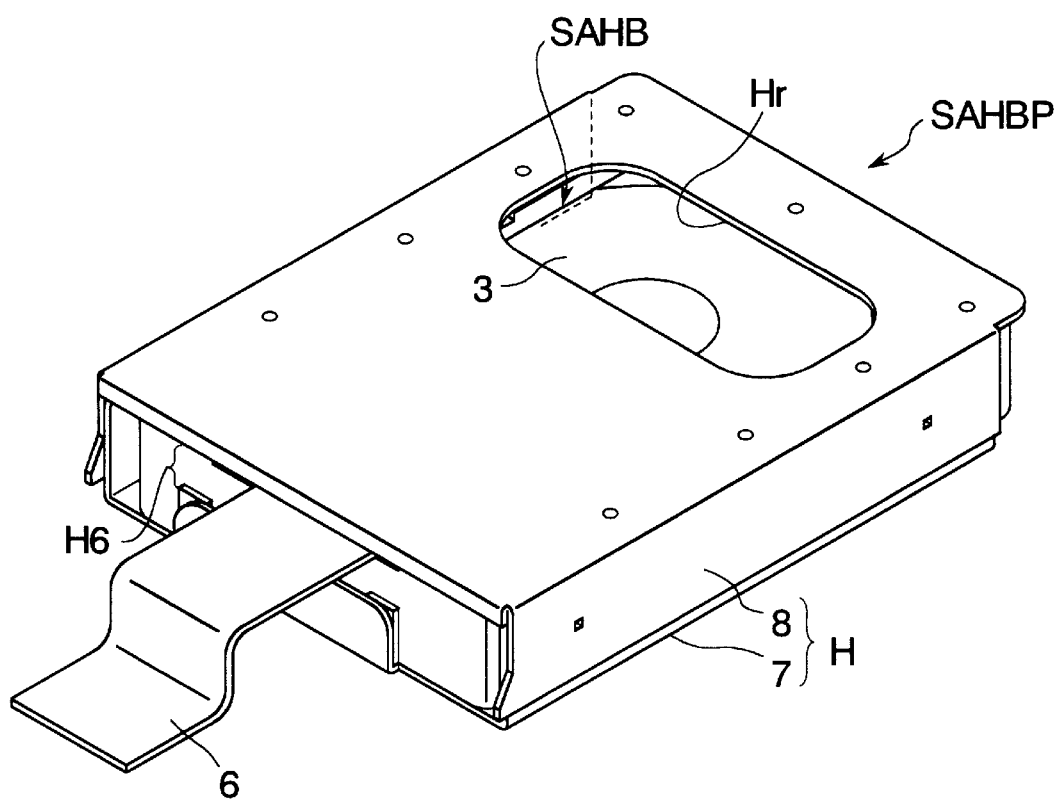
FIG. 8 is a perspective view showing a shock absorbing holder unit according to a second embodiment of the present invention.

Described below is a shock absorbing holder unit according to a second embodiment of the present invention referring to FIGS. 8, 9, 10, 11 and 12. As shown in FIG. 8, a shock absorbing holder unit SAHBP according to the present embodiment has the structure in which the shock absorbing holder unit SAHB according to the above first embodiment is further accommodated in a case assembly H. The case H is structured of a lower case 7 and an upper case 8 fitting into each other. The case H is provided with a space H6 for taking out the signal cable 6 of the hard disk drive 3 and a space Hr for dissipating heated air from the cooling concave portion Ra (Rb) provided on the shock absorbing holder unit SAHB.

Sequentially described next is a method of constructing the shock absorbing holder unit SAHBP referring to FIGS. 9, 10, 11 and 12.

Figure 9:
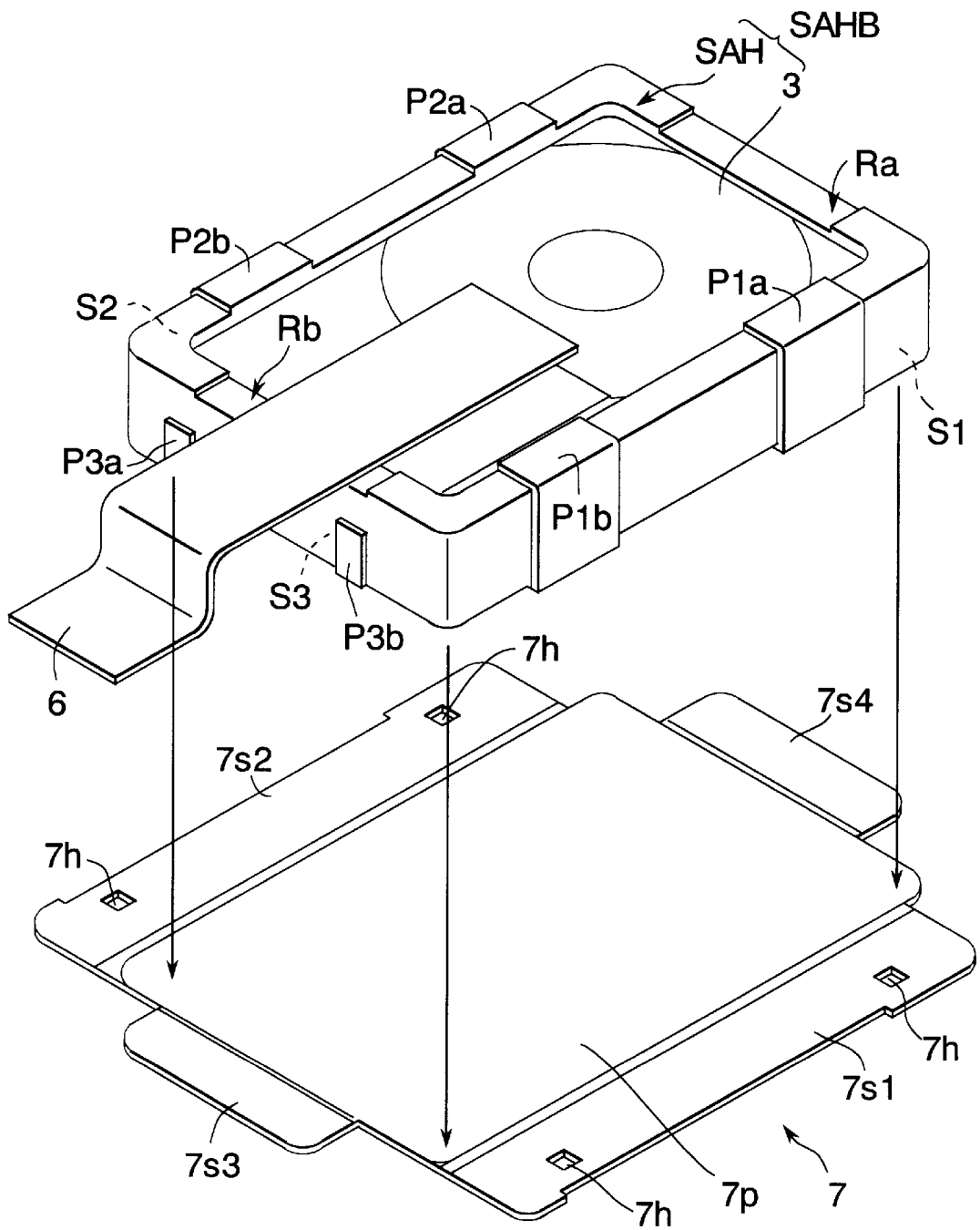
FIG. 9 is a descriptive diagram showing an assembling method of the shock absorbing holder unit shown in FIG. 8.

As shown in FIG. 9, the lower case 7 is structured of a flat plate portion 7p having an approximately rectangular shape covering the outer shape of the shock absorbing holder unit SAHB, and a sheet material having side wall portions 7s1, 7s2, 7s3 and 7s4 having a shape mostly covering each of the side walls S1, S2, S3 and S4 of the shock absorbing holder unit SAHB. As described later, these side wall portions 7s1, 7s2, 7s3 and 7s4 are folded approximately perpendicular to the flat plate portion 7p to form the lower case 7 having space for accommodating the shock absorbing holder unit SAHB. The side wall portions 7s1 and 7s2 are provided with holes 7h having an approximately rectangular shape in positions preferably so as not to abut on the protruding portions P1a, P1b, P2a and P2b when the shock absorbing holder unit SAHB is accommodated.

Figure 10:
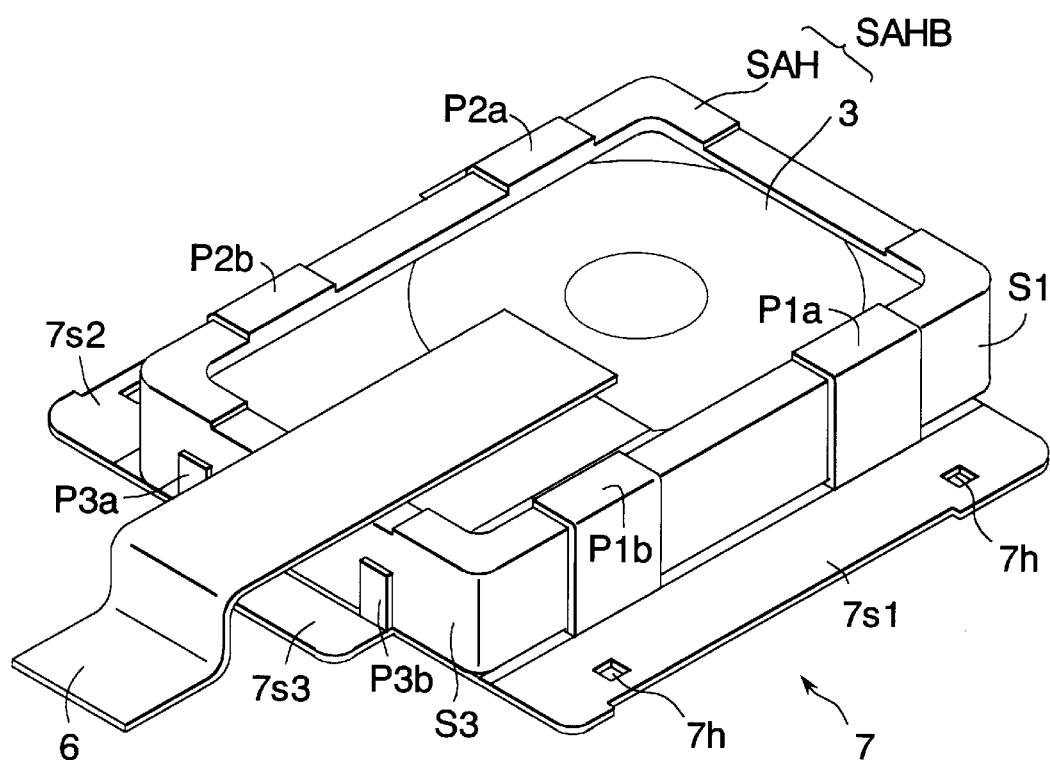
FIG. 10 is a descriptive diagram showing the next step following a step shown in FIG. 9 in the assembling method of the shock absorbing holder unit shown in FIG. 8.

As shown in FIG. 10, the shock absorbing holder unit SAHB is placed on the above flat plate 7p. At this time the protruding portions P1a, P1b, P2a and P2b provided on the shock absorbing holder SAH directly abut on the flat plate portion 7p. Therefore, in the shock absorbing holder unit SAHB, space is kept between the lower plates Bp1, Bp2, Bp3 and Bp4 and the flat plate portion 7p.

Figure 11:
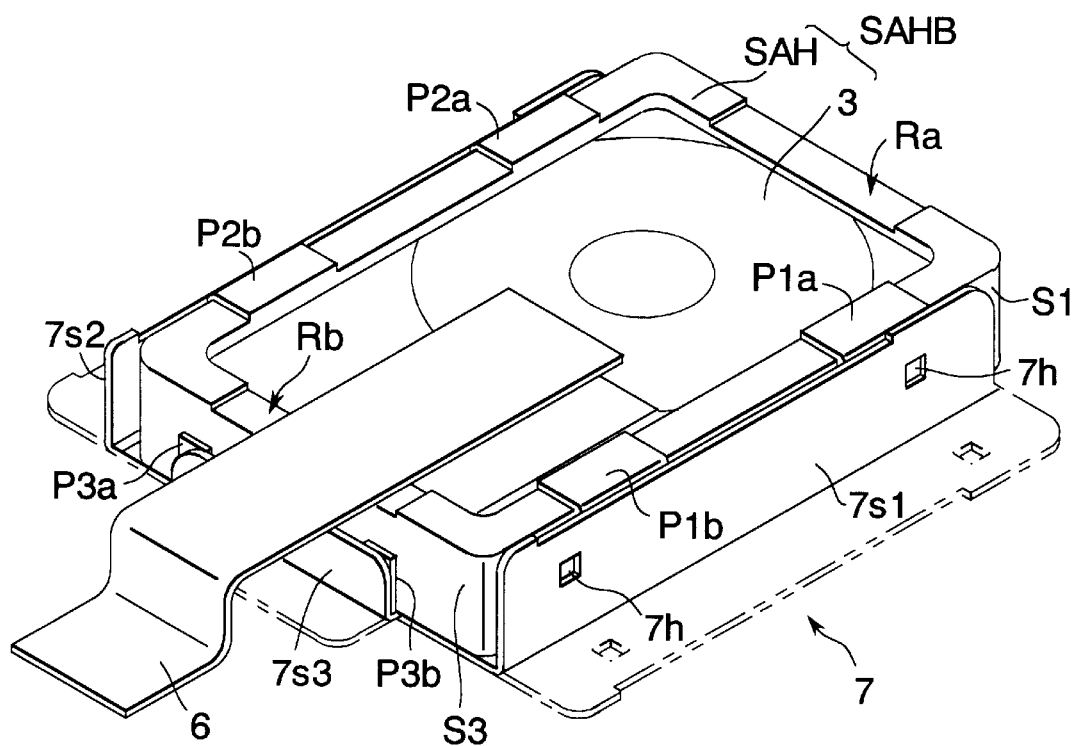
FIG. 11 is a descriptive diagram showing the next step following a step shown in FIG. 10 in the assembling method of the shock absorbing holder unit shown in FIG. 8.

Next, as shown in FIG. 11, each of the side wall portions 7s1, 7s1, 7s3 and 7s4 are folded toward the corresponding side wall S1, S2, S3 and S4 of the shock absorbing holder SAH. At this time, the side wall portion 7s1 abuts on the protruding portions P1a and P1b provided on the side wall S1 of the shock absorbing holder SAH, and makes no direct contact with the side wall S1. In this way, space is kept between the side wall portion 7s1 and the side wall S1. Similarly, the side wall portions 7s2, 7s3 and 7s4 are folded to wrap up and hold the shock absorbing holder unit SAHB, keeping space between the lower case 7 and the shock absorbing holder unit SAHB.

Figure 12:
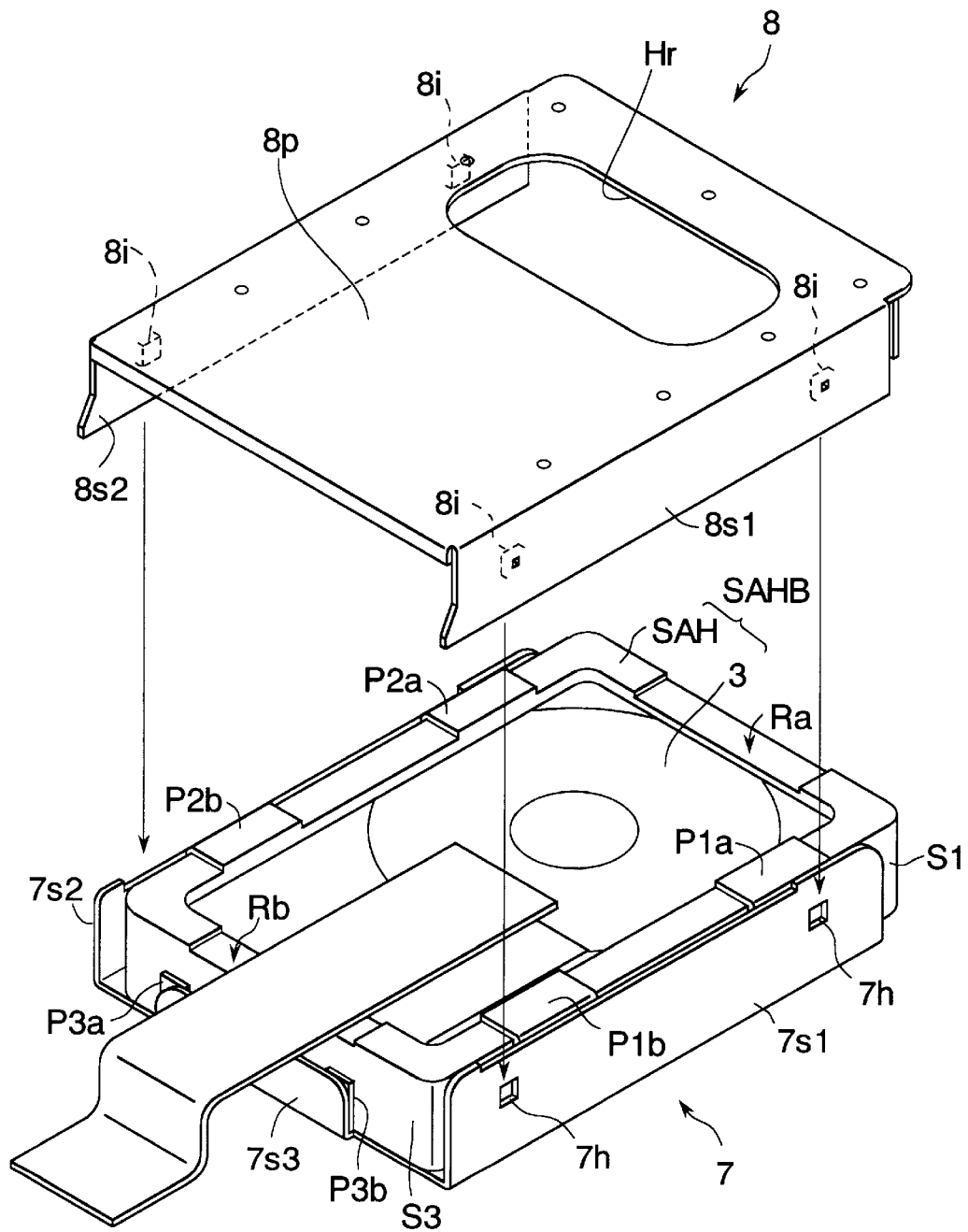
FIG. 12 is a descriptive diagram showing the next step following a step shown in FIG. 11 in the assembling method of the shock absorbing holder unit shown in FIG. 8.

Next, as shown in FIG. 12, the shock absorbing holder SAHB wrapped up and held by the lower case 7 is inserted into the upper case 8. The upper case 8 is structured of a flat plate portion 8p having an approximately rectangular shape covering the outer shape of the shock absorbing holder unit SAHB and a sheet material having side wall portions 8s1 and 8s2 having shapes approximately covering the side walls S1 and S2 of the shock absorbing holder unit SAHB. The side wall portions 8s1 and 8s2 are folded approximately perpendicular to the flat plate portion 8p to form space for accommodating the shock absorbing holder unit SAHB held by the lower case 7. The inner sides of the side wall portions 8s1 and 8s2 are provided with protruding portions 8i corresponding to the holes 7h provided on the side wall portions 7s1 and 7s2 of the lower case 7.

The lower case 7 holding the shock absorbing holder unit SAHB is inserted into the above structured upper case 8 so that the side wall portions 7s1 and 7s2 of the lower case 7 are respectively positioned inside of the side wall portions 8s1 and 8s2 of the upper case 8. At this time, the protruding portions 8i provided on the inner walls of the side wall portions 8s1 and 8s2 fit into the holes 7h provided on the side wall portions 7s1 and 7s2 to securely connect the upper case 8 and the lower case 7.

The lower case 7 receives pressure from inside by the accommodated shock absorbing holder SAH, thereby connecting the protruding portions 8i and the holes 7h to make the sheet-shaped lower case 7 and the upper case 8 an integral unit, holding the hard disk drive 3 wrapped inside the shock absorbing holder SAH. In this, and in this state, these cases are inserted into the case of the information processor. For the purpose of convenience of installing the shock absorbing holder unit SAHBP as structured above into the information processor, the upper case 8 may be a chassis.

In the information processor as structured above according to the present embodiment, the hard disk drive 3 is wrapped up by the shock absorbing holder SAH, and can be inserted into the upper case (chassis) 8, after being wrapped up by the sheet-shaped case 7 which can be assembled by folding, thereby preventing the shock absorbing holder from losing its shape when inserted into the upper case (chassis) 8. Further, since the surface of the shock absorbing holder has viscosity, it is difficult to insert it alone into the case of the information processor. However, with the shock absorbing holder unit SAHB accommodated in the case assembly H, the surface of the shock absorbing holder SAH does not make contact with the information processor, allowing easy attachment/detachment to/from the case of the information processor. It is also possible to make the hardness of the material of the shock absorbing holder SAH lower, allowing great improvement in the shock absorbing capability.

In this way, in the present embodiment, integration of the hard disk drive protected by the shock absorbing holder with lower hardness is possible compared with the prior art, thereby improving shock absorbing capability and easy attachment/detachment of the hard disk drive.

Although the shock absorbing holder unit SAHBP is inserted in the case of the information processor with the sheet-shaped case 7 inserted in the upper case (chassis) 8 in the present embodiment, the shock absorbing holder unit SAHBP may be directly inserted therein only being covered by the sheet-shaped case 7.

Described in the present embodiment is the example in which the shock absorbing holder SAH according to the first embodiment referring to FIGS. 1 to 7 is further accommodated by the lower case 7 or the upper case 8. However, as described above, the shock absorbing holder SAH may be structured without being provided with the protruding portions P. It is needless to say that the shock absorbing holder SAHBP may be structured so that the shock absorbing holder SAH without the protruding portions P is accommodated in the lower case 7 or the upper case 8.

(Third Embodiment)

Described is a shock absorbing holder and shock absorbing holder unit according to a third embodiment of the present invention referring to FIGS. 13, 14, 15, 16, 17 and 18. In the present embodiment, the shock absorbing holder accommodates a hard disk drive to construct a first shock absorbing holder unit. Next, another case further accommodates the first shock absorbing holder unit to construct a second shock absorbing holder unit. Described first is the shock absorbing holder and the first absorbing holder unit according to the present embodiment referring to FIGS. 13, 14, 15 and 16.

Figure 13:
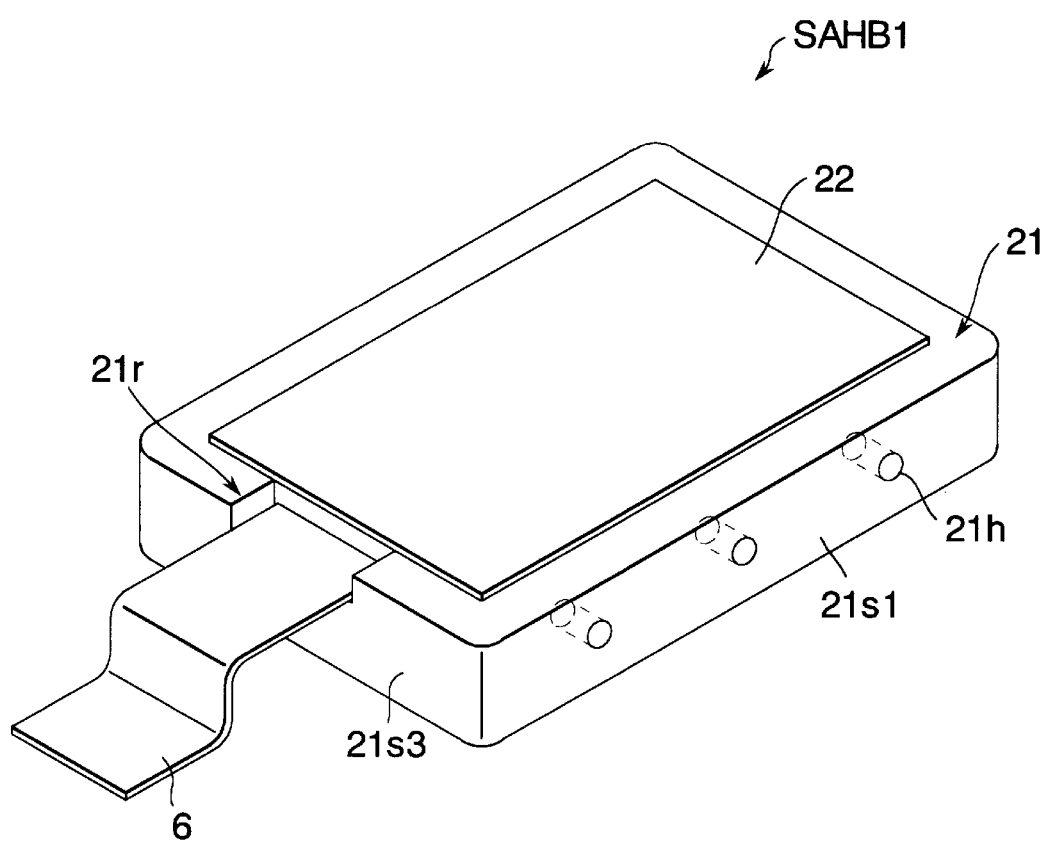
FIG. 13 is a perspective view showing a shock absorbing holder unit according to a third embodiment of the present invention.
Figure 14:
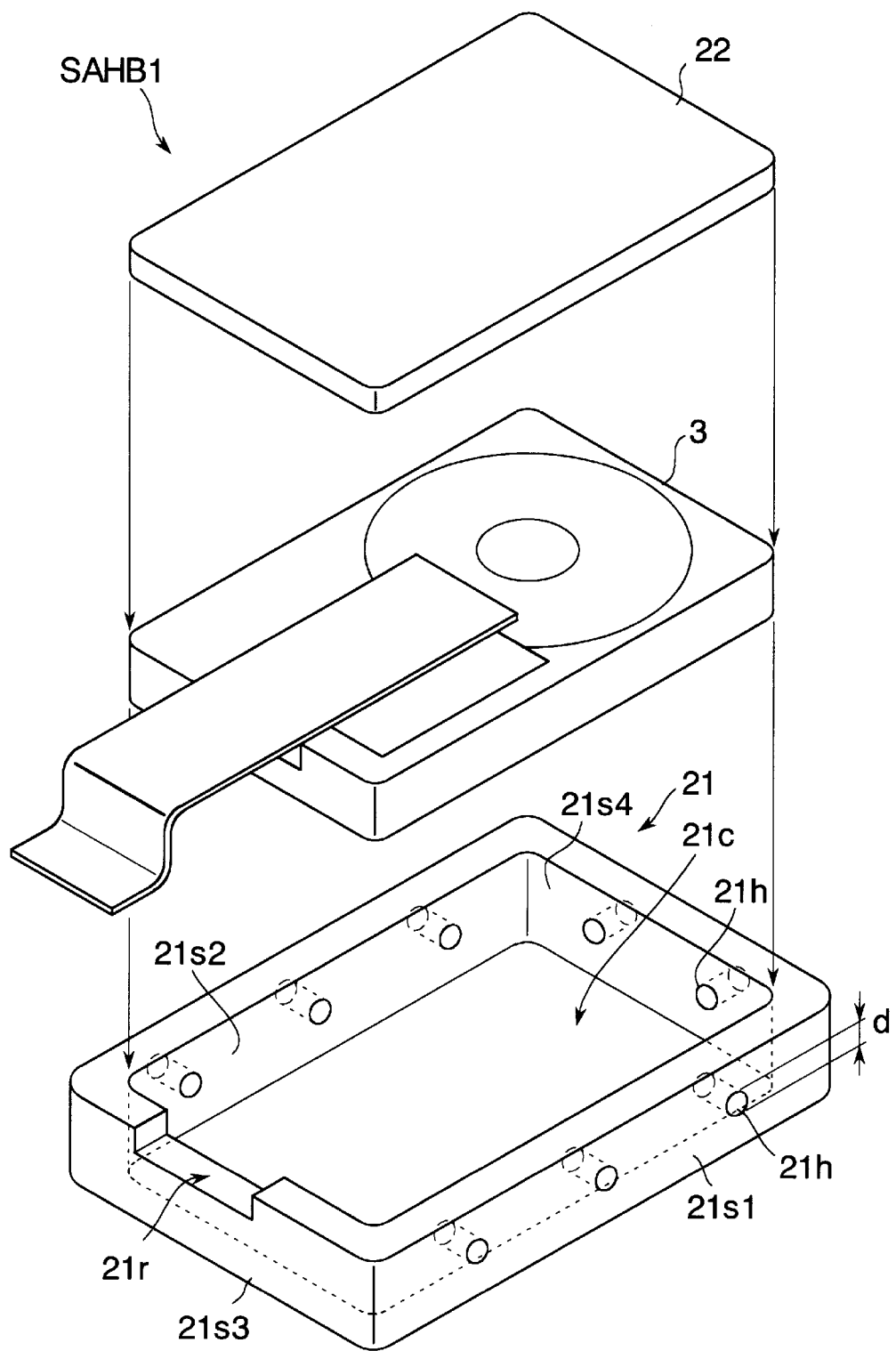
FIG. 14 is an exploded perspective view of the shock absorbing holder unit shown in FIG. 13.

As shown in FIGS. 13 and 14, a shock absorbing holder unit SAHB1 according to the present embodiment is structured of a hard disk drive 3, a shock absorbing holder 21 and a cover 22. The shock absorbing holder 21 is molded of gel material having low hardness and low repulsion properties in a box shape having a concave portion 21c according to the shape of the hard disk drive 3. Side wall portions 21s1, 21s2, 21s3 and 21s4 of the shock absorbing holder 21 are provided with openings 21h. Further, the center portion of the side wall portion 21s3 is provided with a concave portion 21r according to a signal cable 6 of the hard disk drive 3.

The concave portions 21c and 21r of the shock absorbing holder 21 accommodates the main body of the hard disk drive 3 and the signal cable 6, respectively, and the cover 22 fits into the concave portion 21c and holds down the hard disk drive 3, thereby constructing a shock absorbing holder unit SAHB1.

Figure 15:
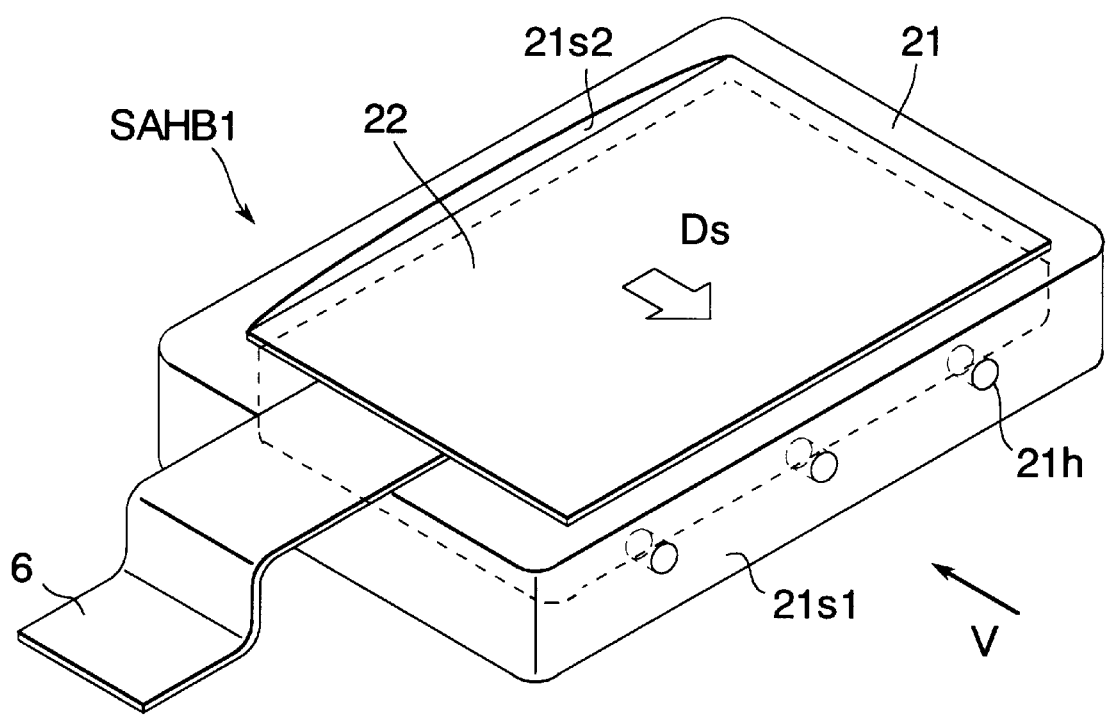
FIG. 15 is a descriptive diagram showing a state when shock is imported to the shock absorbing holder unit shown in FIG. 13.
Figure 16:
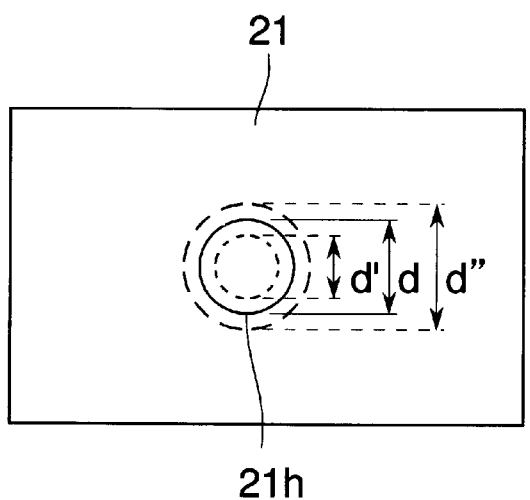
FIG. 16 is an enlarged detailed view when the shock absorbing holder unit is viewed from an arrow V direction shown in FIG. 15.

Referring to FIGS. 15 and 16, described next is a case in which, with the shock absorbing holder unit SAHB1 alone or embedded in the main body of the information processor, the accommodated hard disk drive 3 receives shock forcing it to move in a Ds direction. In this case, movement of the hard disk drive 3 deforms the shock absorbing holder 21 as shown in FIG. 15.

The deformation of the shock absorbing holder 21, that is, shock force, is absorbed by deforming the openings 21h provided on the side wall portions 21s. As to such deformation of the openings 21h, generally in the side wall portion (21s1) under pressure, as shown in FIG. 16, a diameter d of the opening 21h is reduced to d'. Although the shape of the opening 21h after deformation is represented as a perfect circle in FIG. 16 for the purpose of simple description, it is needless to say that various shapes can be taken. The openings 21h may be provided on the side wall portion 21s3, and further an arbitrary number of openings 21h may be provided at arbitrary positions of the side wall portions 21s.

Figure 17:
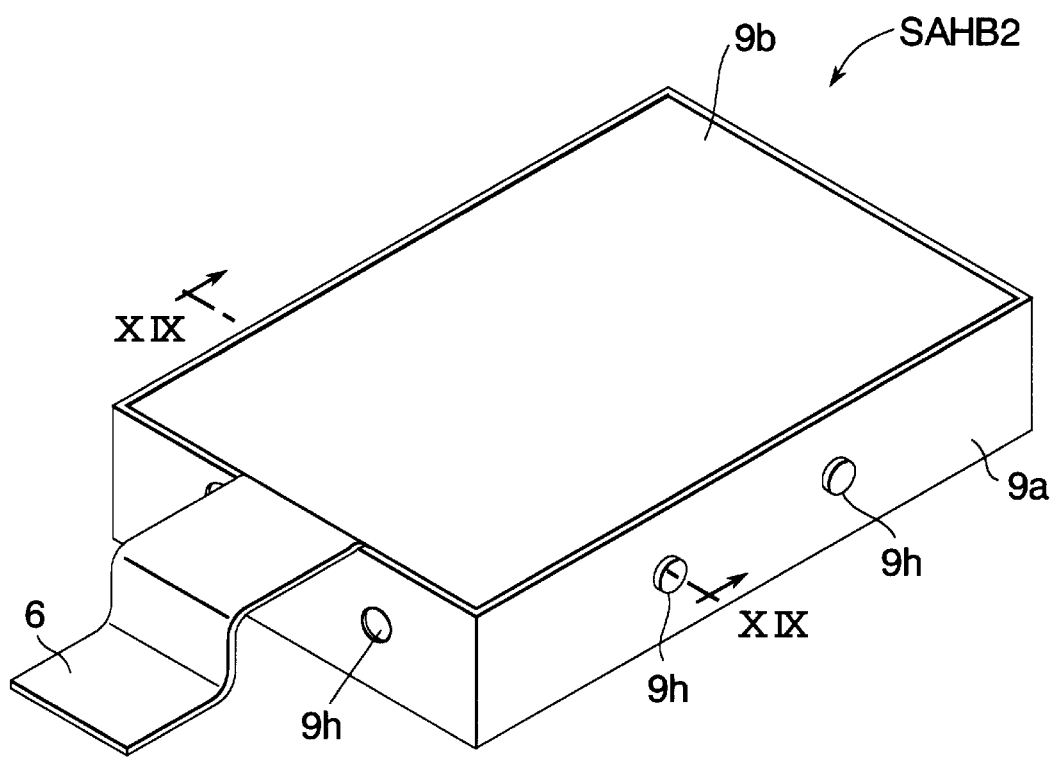
FIG. 17 is a perspective view of a second shock absorbing holder unit according to the third embodiment of the present invention.
Figure 18:
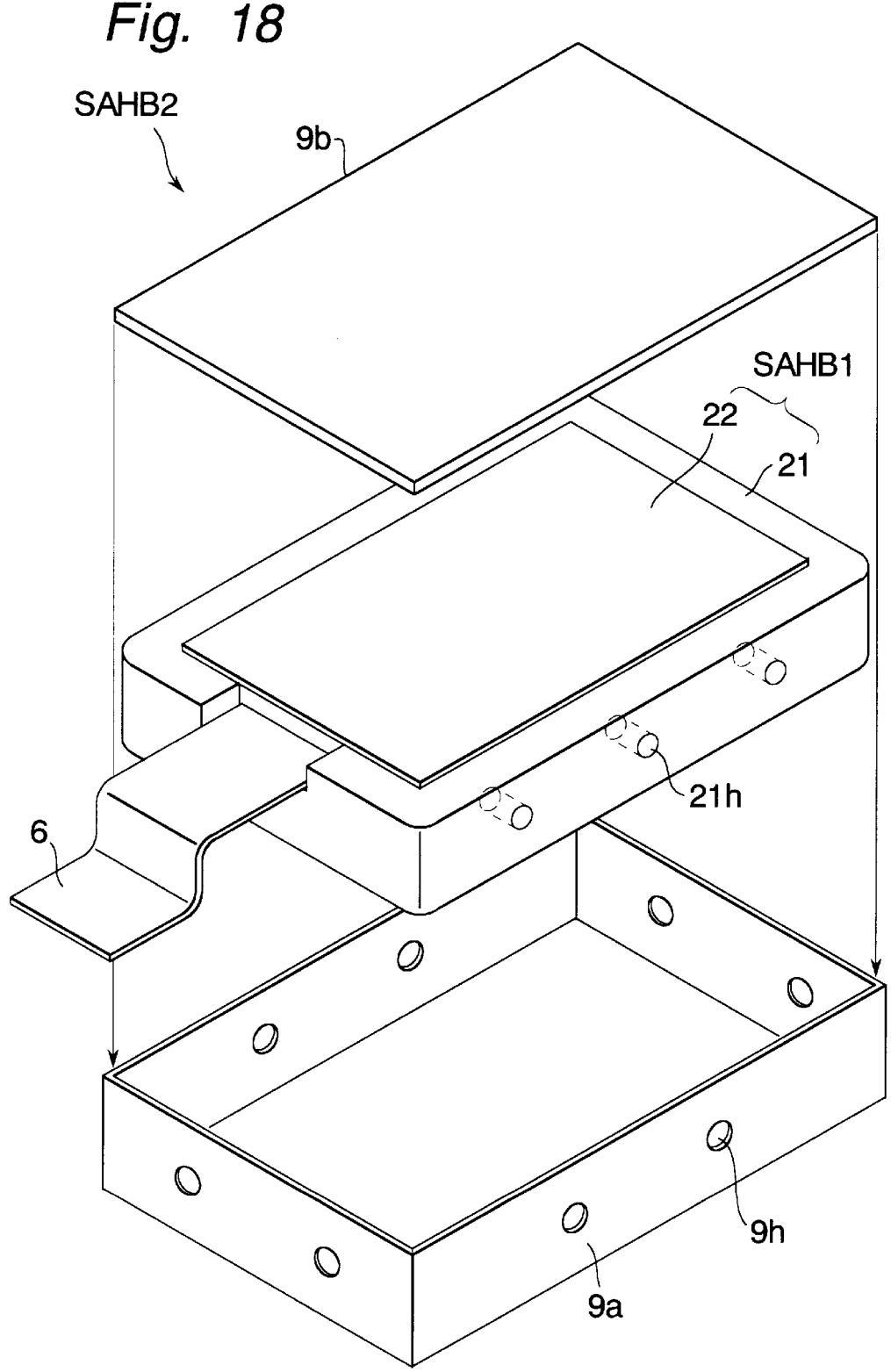
FIG. 18 is an exploded perspective view of the shock absorbing hold unit shown in FIG. 17.

Described next is the second shock absorbing holder unit according to the present embodiment referring to FIGS. 17, 18 and 19. A second shock absorbing holder unit SAHB2 is, as shown in FIGS. 17 and 18, structured by accommodating the above first shock absorbing holder unit in a metal case 9a and then covering it by a metal lid 9b, forming an integral unit. Side walls of the metal case 9a are provided with openings 9h.

Described next is a case in which, being alone or stored in the main body of the information processor, the above structured shock absorbing holder unit SAHB2 receives shock by unprepared falling, etc. This case is basically the same as the case in which the above shock absorbing holder unit SAHB1 receives shock. However, in the shock absorbing holder unit SAHB2, the shock absorbing holder unit SAHB1 is further formed as a unit by the metal case 9a and the metal lid 9b and therefore the deformation of the shock absorbing holder SAH by shock is basically absorbed by, first, deforming openings 21h, and second, deforming the side 'wall portions 21sso as to protrude through the openings 9h provided in the metal case 9a.

Figure 19:
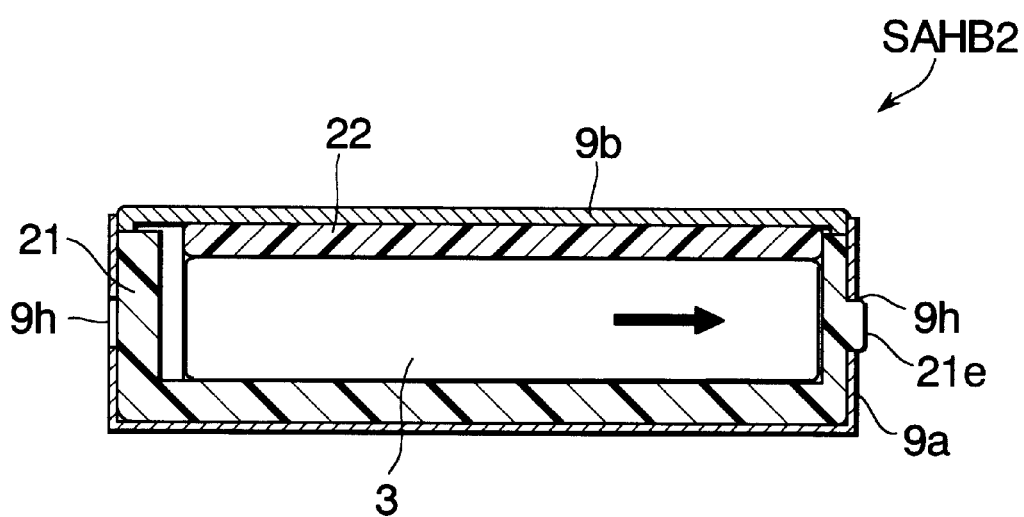
FIG. 19 is a XIX—XIX section view of the shock absorbing holder unit shown in FIG. 17.

Like a protruding portion 21e shown in FIG. 19, by deforming part of the shock absorbing holder SAH, shock force is absorbed more effectively, as shown with deformation of the openings 21h. Without these openings, the deformed part of the shock absorbing holder 21 cannot relieve anywhere and the shock is increased and transferred to the hard disk drive 3 by repulsion force due to the shock.

In this way, the shock absorbing holder and the case for accommodating the shock absorbing holder are provided with openings, thereby relieving the amount of deformation of the shock absorbing holder, and as a result, allowing effective shock absorption of the shock absorbing holder. Although the openings 9h are provided in the side surface sides in the present embodiment, they may be provided in a lateral direction, such as on the cover 22 and the metal lid 9b. Furthermore, the metal case 9a and the metal lid 9b are not necessarily made of metal and they may be made of material having intensity capable of sufficiently suppressing the deformation of the outer shape of the shock absorbing holder SAH of the accommodated first shock absorbing holder unit SAHB1.

Further, the metal case 9a and the metal lid 9b may not be made of metal, and may be structured of resin having an intensity according to its application.

In the present embodiment, the shock absorbing holder unit SAHB1 is structured in such a way that the metal case 9a and the metal lid 9b accommodate the shock-sensitive device accommodated by the shock absorbing holder 21 and the cover 22 having a shape larger than the shock-sensitive device. However, the shock absorbing holder unit SAHB1 may be structured in a way that the metal case 9a and the metal lid 9b accommodate the shock absorbing holder SAH (regardless of the presence or absence of the protruding portions P) according to the first embodiment with the shock-sensitive device accommodated.

(Fourth Embodiment)

Described below are shock absorbing holder units according to a fourth embodiment of the present invention referring to FIGS. 20, 21 and 22. Also in the present embodiment, as in the third embodiment, a shock absorbing holder accommodates a hard disk drive to construct a first shock absorbing holder unit, and another case further accommodates the first shock absorbing holder unit to construct a second shock absorbing holder unit.

Figure 20:
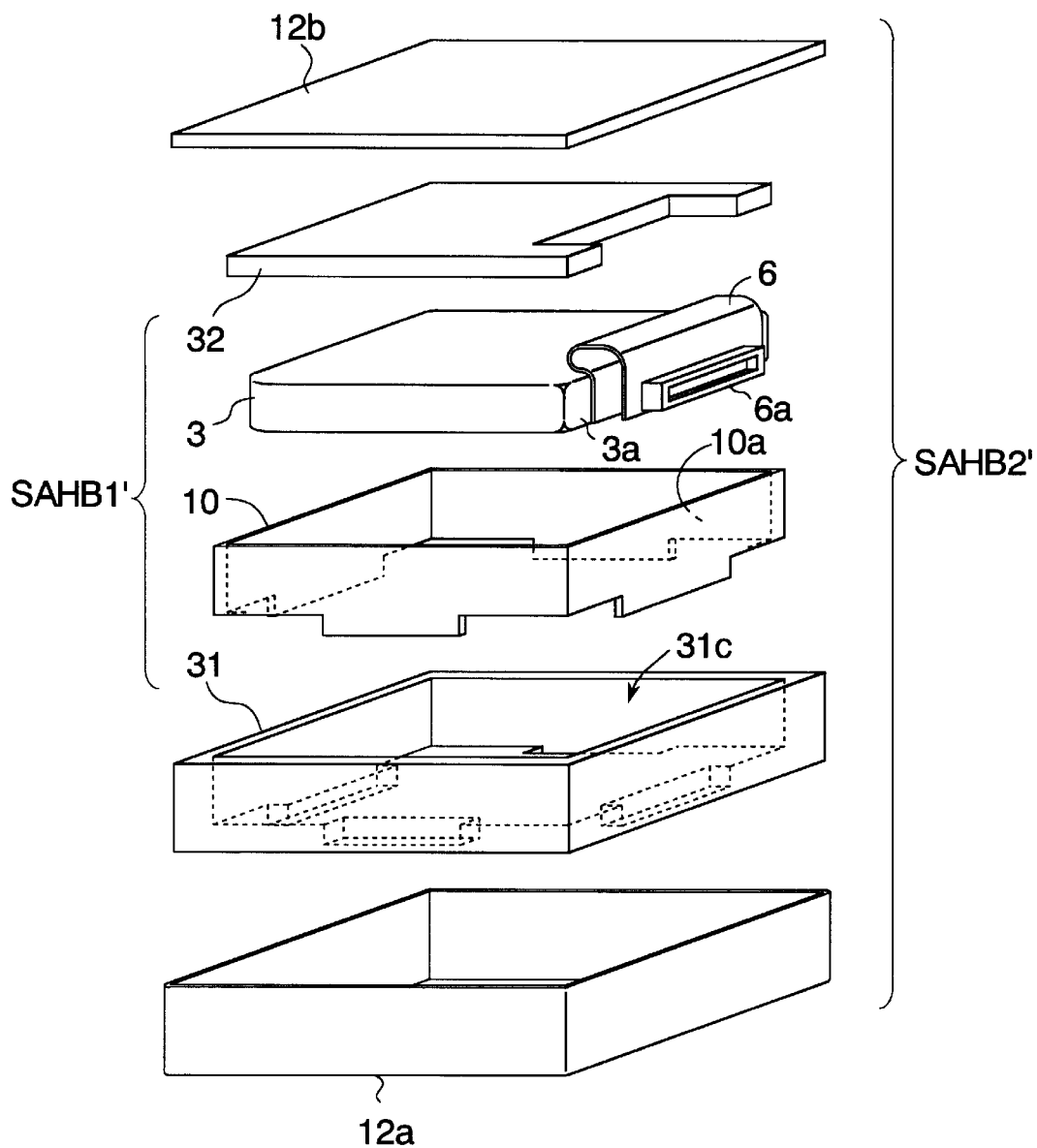
FIG. 20 is an exploded perspective view of the shock absorbing holder units according to the fourth embodiment of the present invention.
Figure 21:
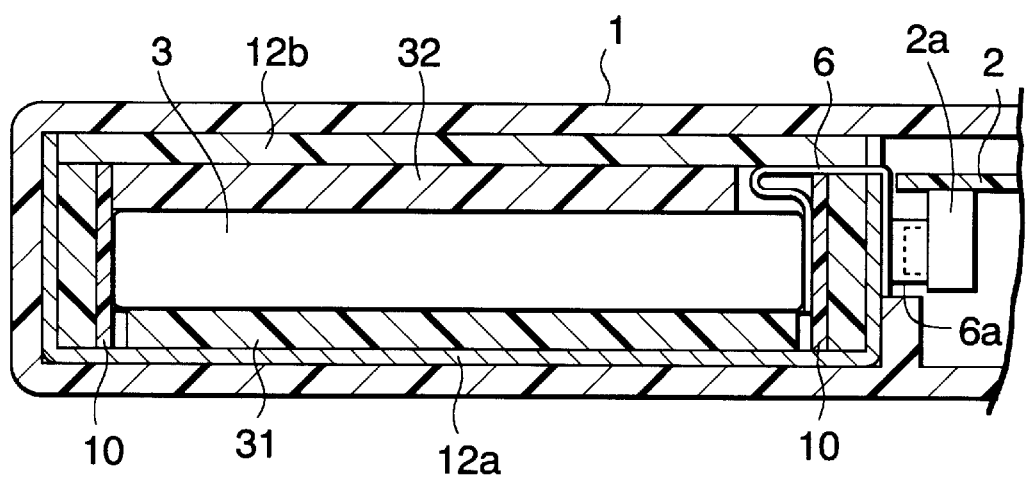
FIG. 21 is a section view of main parts of the shock absorbing holder units shown in FIG. 20.
Figure 22:
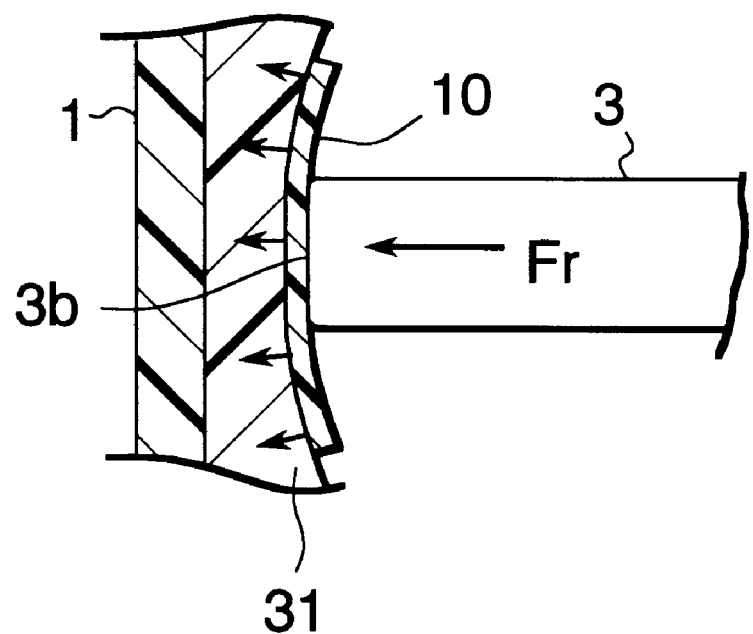
FIG. 22 is a descriptive diagram showing a state when shock is imported to the shock absorbing holder units shown in FIG. 20.

As shown in FIGS. 20 and 21, a shock absorbing holder unit SAHB' according to the present embodiment is structured of a hard disk drive 3, a resin case 10, a metal case 12a, a lid 12b of the metal case, a shock absorbing holder 31 and a cover 32.

Connected to a side surface 3a of the hard disk drive 3 is a signal cable 6 with a connector 6a at its front end. The shock absorbing holder 31 has a concave portion 31c formed according to the shape of the hard disk drive 3 and made of gel material having a property of a low hardness and a low repulsion coefficient. The cover 32 is structured of the same material as that of the shock absorbing holder 31 in a shape corresponding to an opening portion of the concave portion 31c. The resin case 10 is structured of a resin sheet in a shape corresponding to a bottom surface portion of the concave portion 31c. In the resin case 10, the area of its flat-shaped surface 10a opposed to the side surface 3a of the hard disk drive 3 is larger than that of the side surface 3a.

In the present embodiment, the resin case 10 is accommodated in the concave portion 31c of the shock absorbing holder 31. The hard disk drive 3 is then arranged on the resin case 10 and accommodated therein. The cover 32 is next inserted into the resin case 10 to hold down the hard disk drive 3 accommodated in the concave portion 31c of the shock absorbing holder 31. In this way, the hard disk drive 3 is wrapped up by the resin case 10, the shock absorbing holder 31 and the cover 32 to construct a first shock absorbing holder unit SAHB1'.

The first shock absorbing holder unit SAHB1' is wrapped up and accommodated by the metal case 12a and its lid 12b to construct a second shock absorbing holder unit SAHB2'. At this time, the connector 6a is fixed to the metal case 12a. The length of the signal cable 6 is made longer than a creepage distance between a lead opening of the signal cable 6 of the hard disk drive 3 and the connector 6a for not less than the maximum amount of deformation of the shock absorbing holder. In this state, the second shock absorbing holder unit SAHB2' is accommodated in the storage portion 1c of the case 1 of the information processor DPp as a hard disk drive block.

Described next is a state in which the first shock absorbing holder unit SAHB1' and the second shock absorbing holder unit SAHB2' according to the present embodiment receive shock in a side surface direction of the hard disk drive 3, referring to FIG. 22. When the hard disk drive 3 receives shock in a direction of a side surface 3b, that is, shock to move in an Fr direction, the resin case 10 arranged between the shock absorbing holder 31 and the hard disk drive 3 first receives the movement of the hard disk drive 3.

The resin case 10 has higher hardness than that of the shock absorbing holder 31 and moderate repulsion force, bending by pressure from the side surface 3b of the hard disk drive 3. With the resin case 10 bending, the shock force on the hard disk drive 3 can be absorbed to a degree. Further, not-absorbed shock force can be distributed into an area larger than the side surface 3b of the hard disk drive 3 to be transferred to the shock absorbing holder 31.

Therefore, the hard disk drive 3 will not dig into the shock absorbing holder 31, and even a thin-walled shock absorbing holder having a property of low hardness and a low repulsion coefficient can maintain a shock absorbing effect by combining with the resin case. As a result, this contributes to downsizing of information processors.

Further, a metal case is arranged outside to form a hard disk drive block, allowing easy attachment/detachment to/from the information processor. Even when the hard disk drive block is removed from the case of the information processor for the purpose of maintenance, etc., the hard disk drive keeps holding the shock absorbing structure. Therefore, when the hard disk drive block receives shock, the hard disk itself will not be damaged.

Further, since the signal cable 6 of the hard disk drive 3 is set longer for not less than the amount of deformation of the shock absorbing holder, even when the information processor receives shock and when the hard disk drive 3 receives shock in being attached/detached, the signal cable 6 is flexibly deformed without being affected by the movement and operation of the hard disk drive 3 to maintain electric connection. Further, the signal cable 6 is in the hard disk drive block and only a connector 2b appears outside the hard disk drive block. Therefore, the signal cable 6 is convenient to handle and its connection with a circuit board 2 is very easy. In this way, it is possible to improve operability of attaching/detaching of the hard disk drive and maintain the high shock absorbing structure at the time of attachment/detachment.

Although the shock absorbing holder 31 and the cover 32 are different components made of the same material in the present embodiment, the shock absorbing holder 31 and the cover 32 may be integrally molded or structured with different materials.

Further, when a sheet-shaped thin resin material and a metal component are integrally used for the shock absorbing holder instead of the resin case by a method of integral molding, welding or the, like, it is possible to obtain the same effects and, to dissipate heat occurring in the shock-sensitive device from the space. Furthermore, the shock absorbing holder can relieve the amount of deformation for absorbing shock to the concave portion. Further, although a metal case is arranged outside in the present embodiment, a resin case or the like may be used to construct the outer side.

Further, although a hard disk drive is taken as an example in the above described embodiment, it is needless to say that the present embodiment is useful for all other shock-sensitive devices such as magnetic disk devices and optical disk devices.

As described above, in the present invention, the shock absorbing holder having inner dimensions smaller than outer dimensions of the hard disk drive case and having low hardness and low repulsion is extended and fitted to the hard disk drive, and thus the hard disk drive is wrapped up by the shock absorbing holder. Further, a foldable sheet-shaped case wrapping up the shock absorbing holder is inserted into the case of the information processor, allowing the shock absorbing holder with low hardness and low repulsion to be inserted, thereby keeping its standing on it own.

As a result of the above, the present invention can achieve wall-thickness reduction of the shock absorbing holder and use of the shock absorbing holder with lower hardness. Further, it is possible to improve shock absorbing capability of the shock absorbing holder for protecting a hard disk drive against shocking outer force when being carried and the like.

Between the shock absorbing holder arranged so as to wrap up the hard disk drive and its outside and having a property of low hardness and a low repulsion coefficient and the hard disk drive, an elastic body having a property of higher hardness and higher repulsion coefficient than that of the shock absorbing holder is involved. Further, with the outside of the shock absorbing holder wrapped up by a case with high hardness, the shock absorbing holder is accommodated in the case of the information processor, and thereby the thickness of the shock absorbing holder is made thin to realize a highly-effective, space-saving shock absorbing structure. As a result, it is possible to further downsize shock-proof information processors.

Further, a signal cable led from the hard disk drive is included in the case, a connector of the signal cable is arranged outside the case, and the length of the signal cable is made longer than a creepage distance between a signal cable lead opening and the connector for not less than the maximum amount of deformation of the shock absorbing holder. Therefore, it is possible to improve operability of attaching/detaching of the hard disk drive and maintain a high shock absorbing structure even when the hard disk drive is removed t o be carried or stored, which is quite effective.

Further, in the present embodiment, it is needless to say that the resin case 10 or its equivalent elastic body member can be provided between the shock absorbing holder according to the above first, second and third embodiments and the shock-sensitive device, thereby obtaining the same effects as those of the fourth embodiment.

While the invention has been described in detail, the foregoing description is in all aspects illustrative and not restrictive. It is understood that numerous other modifications and variations can be devised without departing from the scope of the invention.

What is claimed is:

1. A shock absorbing holder apparatus for use in holding and protecting a shock-sensitive device having a predetermined size, said shock absorbing holder apparatus comprising:

a frame body defining therewithin an accommodation space for accommodating the shock-sensitive device having the predetermined size;

wherein said frame body is formed in a shape and of an elastically deformable material which is expandable such that, when relaxed and with the shock-sensitive device not accommodated in said accommodation space, said accommodation space is adapted to be too small to accommodate the shock-sensitive device having the predetermined size, such that said frame body can be stretched to expand said accommodation space to allow for insertion of the shock-sensitive device thereinto, and such that, when the shock-sensitive device is inserted in said accommodation space, said frame body can be relaxed so that said accommodation space is shrunk to be adapted to tightly fit about the shock-sensitive device;

wherein said elastically deformable material and said shape of said frame body is further such that said frame body is deformable to absorb shock from outside said frame body to thereby protect the shock-sensitive device when accommodated in said accommodation space of said frame body; and wherein said frame body is provided with a holding arrangement comprising inner wall surfaces of said frame body for holding the shock-sensitive device; wherein said frame body comprises walls forming a ring shape and having a U-shaped section opening inwardly, and said holding arrangement is defined by said U-shaped section;

wherein said walls of said frame body comprise:

side walls having a shape adapted to correspond to side surfaces of the shock-sensitive device;

and a top wall extending in an approximately perpendicular direction from upper end portions of said side walls for a first predetermined length, part of said top wall is provided with a concave portion having a predetermined depth.

2. In combination with the shock absorbing holder apparatus as claimed in claim 1, a shock-sensitive device, the shock-sensitive device having the predetermined size, said shock-sensitive device being accommodated in said accommodation space of said frame body such that said frame body is tightly fit about the shock-sensitive device with said inner wall surfaces intimately contacting, with outer surfaces of said shock-sensitive device.

3. The combination as claimed in claim 2, wherein
said shock-sensitive device is structured in a shape defined by two surfaces approximately parallel to each other and a plurality of side surfaces approximately perpendicular to the two surfaces;
said walls of said frame body further comprise:
a bottom wall extending in an approximately perpendicular direction from lower end portions of said side walls for a second predetermined length; and
said side walls, said top wall and said bottom wall of said frame body form said U-shaped section.

4. The combination as claimed in claim 2, further comprising
an elastic body arranged between said shock-sensitive device and said frame body, said elastic body having a different hardness or a different repulsion coefficient from that of said frame body; wherein shock to said shock-sensitive device is transferred through said elastic body to said frame body.

5. The combination as claimed in claim 2, wherein
a protruding portion is formed on an outer wall surface of said frame body and said protruding portion is deformable to absorb shock from outside said frame body to protect the shock-sensitive device.

6. The combination as claimed in claim 2, wherein
at least one opening is formed in said frame body.

7. The combination as claimed in claim 2, wherein
said frame body is integrally molded of two or more materials having different hardnesses or different repulsion coefficient properties.

8. The combination as claimed in claim 2, further comprising
a case for wrapping up the shock-sensitive device accommodated in said frame body.

9. The combination as claimed in claim 8, further comprising
a box-shaped chassis having an engaging portion for engaging in said case; wherein said case is inserted in said engaging portion.

10. The combination as claimed in claim 8, wherein
said case is formed to make a space in a predetermined size with said frame body accommodating device the shock-sensitive, and when the shock-sensitive device receives shock from outside, said frame body is deformed along said space to absorb the shock.

11. The combination as claimed in claim 2, wherein
said shock-sensitive device comprises a disk drive device.

12. The combination as claimed in claim 1, wherein
said elastically deformable material comprises gel polystyrene of a hardness ASKER/FP of 30 to 80.

13. The shock absorbing holder apparatus as claimed in claim 1, wherein
said elastically deformable material comprises a thermally conductive material.

14. The shock absorbing holder apparatus as claimed in claim 13, wherein
said thermally conductive material includes a metal filler.

15. The shock absorbing holder apparatus as claimed in claim 1, wherein
a protruding portion is formed on an outer wall surface of said frame body and said protruding portion is deformable to absorb shock from outside said frame body to protect the shock-sensitive device.

16. The shock absorbing holder apparatus as claimed in claim 15, wherein
said frame body comprises side walls having a shape that is adapted to correspond to said side surfaces of said shock-sensitive device, a top wall extending in an approximately perpendicular direction from upper end portions of said side walls for a first predetermined length, a bottom wall extending in an approximately perpendicular direction from lower end portions of said side walls for a second predetermined length, and said side walls, said top wall and said bottom wall of said frame body form said U-shaped section; and
said protruding portion is provided on at least any one of said side walls, said top wall and said bottom wall of said frame body.

17. The shock absorbing holder apparatus as claimed in claim 16, wherein
said protruding portion is provided in at least one direction on a ring-shaped outer rim of said frame body.

18. The shock absorbing holder apparatus as claimed in claim 1, wherein
at least one opening is formed in said frame body.

19. The shock absorbing holder apparatus as claimed in claim 1, wherein
said frame body is integrally molded of two or more materials having different hardnesses or different repulsion coefficient properties.

20. The shock absorbing holder apparatus as claimed in claim 19, wherein
said materials are elastic bodies and insert-molded.

21. The shock absorbing holder apparatus as claimed in claim 1, further comprising
a case for wrapping up the shock-sensitive device accommodated in said frame body.

22. The shock absorbing holder apparatus as claimed in claim 21, further comprising
a box-shaped chassis having an engaging portion for engaging in said case; wherein said case is inserted in said engaging portion.

23. The shock absorbing holder apparatus as claimed in claim 21, wherein
said case is structured by a sheet material being folded.

24. The shock absorbing holder apparatus as claimed in claim 21, wherein
said case is provided with an opening.

25. An apparatus comprising: an information processor; and said shock absorbing holder apparatus according to claim 1, wherein said shock absorbing holder apparatus is embedded in said information processor.

26. In combination with the apparatus as claimed in claim 25, a shock-sensitive device,
the shock-sensitive device being accommodated in said frame body.

27. A shock absorbing holder apparatus for use in holding and protecting a shock-sensitive device having a predetermined size, said shock absorbing holder apparatus comprising:
a shock absorbing holder comprising a box defining therewithin an accommodation space sized for accommodating the shock-sensitive device without deformation of said box;
wherein said box is formed of a deformable material having low hardness and low repulsion properties such that, when the shock-sensitive device is accommodated in said accommodation space and a shock is imparted thereto, said box will deform to absorb the shock; and
wherein said box is provided with a holding arrangement comprising inner wall surfaces of said box for holding the shock-sensitive device;

wherein an elastic body is adapted to be arranged between the shock-sensitive device and said shock absorbing holder, said elastic body has at least one surface among surfaces adapted to be opposed to the shock-sensitive device that is adapted to be larger than a corresponding opposed surface of the shock-sensitive device.

28. The shock absorbing holder apparatus as claimed in claim 27, further comprising the shock-sensitive device having the predetermined size;

wherein said accommodation space of said box is larger than said predetermined size of said shock-sensitive device, and said shock-sensitive device is disposed in said accommodation space of said box.

29. The combination as claimed in claim 28, wherein at least one hole is formed in a side wall of said box such that, when a shock is imparted, the deformation of said box to absorb the shock includes deformation of said at least one opening to absorb the shock.

30. The combination as claimed in claim 29, wherein said box includes side walls, and said at least one opening is formed in said side walls.

31. The combination as claimed in claim 28, comprising:

said elastic body having a different hardness or a different repulsion coefficient from that of said shock absorbing holder; wherein shock to said shock-sensitive device is transferred through said elastic body to said shock absorbing holder.

32. The combination as claimed in claim 31, wherein said elastic body has higher hardness or a higher repulsion coefficient than that of said shock absorbing holder.

33. The combination as claimed in claim 31, wherein said elastic body intimately contacts with said holding arrangement.

34. The combination as claimed in claim 31, further comprising:

a case with hardness higher than that of said elastic body; wherein said shock-sensitive device held by said holding arrangement is inserted in said case.

35. The combination as claimed in claim 34, wherein a length of a signal cable for use in connection between a connector arranged outside said case and said shock-sensitive device is longer than a creepage distance between a lead opening of the signal cable in said shock-sensitive device and said connector for no less than a maximum amount of deformation of said shock absorbing holder.

36. The combination as claimed in claim 28, further comprising a case for wrapping up the shock-sensitive device accommodated in said box.

37. The combination as claimed in claim 36, wherein said case is formed so as to make a space in predetermined size with said shock absorbing holder accommodating the shock-sensitive device, and when the shock-sensitive device receives shock from outside, said shock absorbing holder is deformed along said space to absorb the shock.

38. The combination as claimed in claim 28, wherein said shock-sensitive device comprises a disk drive device.

39. The shock absorbing holder apparatus as claimed in claim 27, wherein said deformable material comprises gel polystyrene of a hardness ASKER/FP of 30 to 80.

40. The shock absorbing holder apparatus as claimed in claim 27, wherein said deformable material comprises a thermally conductive material for dissipating heat from the shock-sensitive device to outside of said box.

41. The shock absorbing holder apparatus as claimed in claim 40, wherein said thermally conductive material includes a metal filler.

42. The shock absorbing holder apparatus as claimed in claim 27, wherein said deformable material includes a metal filler.

43. The shock absorbing holder apparatus as claimed in claim 27, wherein said box is integrally molded of two or more materials having different hardnesses or different repulsion coefficient properties.

44. The shock absorbing holder apparatus as claimed in claim 43, wherein said materials are elastic bodies and insert-molded.

45. The shock absorbing holder apparatus as claimed in claim 27, further comprising a case for wrapping up the shock-sensitive device accommodated in said box.

46. The shock absorbing holder apparatus as claimed in claim 45, wherein said case is structured by a sheet material being folded.

47. The shock absorbing holder apparatus as claimed in claim 45, wherein said case is structured of metal.

48. The shock absorbing holder apparatus as claimed in claim 45, wherein said case is provided with an opening.

49. The shock absorbing holder apparatus as claimed in claim 45, wherein said case is formed so as to make a space in predetermined size with said shock absorbing holder accommodating the shock-sensitive device, and when the shock-sensitive device receives shock from outside, said shock absorbing holder is deformed along said space to absorb the shock.

50. The shock absorbing holder apparatus as claimed in claim 27, wherein at least one hole is formed in a side wall of said box such that, when a shock is imparted, the deformation of said box to absorb the shock includes deformation of said at least one opening to absorb the shock.

51. The shock absorbing holder apparatus as claimed in claim 50, wherein said box includes side walls, and said at least one opening is formed in said side walls.

52. An apparatus comprising an information processor; and said shock absorbing holder apparatus according to claim 27, wherein said shock absorbing holder apparatus is embedded in said information processor.

53. The apparatus according to claim 52, wherein said shock absorbing holder apparatus includes the shock-sensitive device accommodated in said box.

* * * * *